(12) United States Patent
Rossbach et al.

(10) Patent No.: US 12,120,673 B2
(45) Date of Patent: Oct. 15, 2024

(54) UPLINK GRANT PRIORITIZATION ENHANCEMENT

(71) Applicant: APPLE INC., Cupertino, CA (US)

(72) Inventors: Ralf Rossbach, Neubiberg (DE); Fangli Xu, Beijing (CN); Sigen Ye, Cupertino, CA (US); Weidong Yang, Cupertino, CA (US); Wei Zeng, Cupertino, CA (US); Sarma V. Vangala, Cupertino, CA (US); Wenshu Zhang, Cupertino, CA (US); Haijing Hu, Cupertino, CA (US); Murtaza A. Shikari, Cupertino, CA (US); Amir Aminzadeh Gohari, Cupertino, CA (US); Francois E. Deparis, Munich (DE)

(73) Assignee: APPLE INC., Cupertino, CA (US)

( * ) Notice: Subject to any disclaimer, the term of this patent is extended or adjusted under 35 U.S.C. 154(b) by 300 days.

(21) Appl. No.: 17/593,175

(22) PCT Filed: Jan. 14, 2021

(86) PCT No.: PCT/CN2021/071898
§ 371 (c)(1),
(2) Date: Sep. 10, 2021

(87) PCT Pub. No.: WO2022/151244
PCT Pub. Date: Jul. 21, 2022

(65) Prior Publication Data
US 2023/0180217 A1    Jun. 8, 2023

(51) Int. Cl.
*H04W 72/23* (2023.01)
*H04W 72/1268* (2023.01)
*H04W 72/563* (2023.01)

(52) U.S. Cl.
CPC ....... *H04W 72/1268* (2013.01); *H04W 72/23* (2023.01); *H04W 72/563* (2023.01)

(58) Field of Classification Search
None
See application file for complete search history.

(56) References Cited

U.S. PATENT DOCUMENTS

2020/0107356 A1*  4/2020  Rico Alvarino ...... H04W 72/21
2020/0367261 A1*  11/2020  Huang .............. H04W 74/0816
(Continued)

FOREIGN PATENT DOCUMENTS

| CN | 111201827 A | 5/2020 |
|---|---|---|
| WO | 2020068919 A1 | 4/2020 |
| WO | 2020125472 A1 | 6/2020 |

OTHER PUBLICATIONS

3rd Generation Partnership Project; Technical Specification Group Radio Access Network; NR; Radio Resource Control (RRC) protocol specification (Release 16), 3GPP TS 38.331, v16.1.0 (Jul. 2020), pp. 1-886 (Year: 2020).*

(Continued)

*Primary Examiner* — Benjamin Lamont
(74) *Attorney, Agent, or Firm* — Dorsey & Whitney LLP

(57) ABSTRACT

Provided is a method for a user equipment (UE), comprising: obtaining one or more indications associated with uplink transmission scheduled by one or more uplink (UL) grants, the one or more UL grants including a UL grant for a physical uplink share channel (PUSCH) with uplink control information (UCI), selecting a UL grant for transmission from the one or more UL grants based at least in part upon the one or more indications, such that the UL grant for the PUSCH with UCI is prioritized for selection, and causing a PUSCH corresponding to the selected UL grant to be transmitted.

15 Claims, 13 Drawing Sheets

(56) References Cited

U.S. PATENT DOCUMENTS

| | | | | |
|---|---|---|---|---|
| 2021/0235477 A1* | 7/2021 | Baldemair | ............ | H04L 5/0005 |
| 2021/0329688 A1* | 10/2021 | Salim | .................... | H04L 5/0094 |
| 2022/0007385 A1* | 1/2022 | Dudda | ...................... | H04L 1/08 |
| 2022/0232581 A1* | 7/2022 | Koziol | .................. | H04W 72/20 |
| 2023/0354343 A1* | 11/2023 | Li | ....................... | H04W 72/566 |

OTHER PUBLICATIONS

Interdigital Inc. , "UCI Enhancements for eURLLC", R1-1912729, 3GPP TSG RAN WG1 #99, Reno, Nevada, Agenda Item 7.2.6.2, Nov. 18-22, 2019, 9 pages.

LG Electronics , "Discussion on Intra-UE multiplexing/prioritization", R1-2008060, 3GPP TSG RAN WG1 #103-e, e-Meeting, Agenda Item 8.3.3, Oct. 26-Nov. 13, 2020, 11 pages.

PCT/CN2021/071898 , International Search Report and Written Opinion, Oct. 15, 2021, 8 pages.

\* cited by examiner

700

710 — IN ACCORDANCE WITH A DETERMINATION THAT A UL GRANT OF THE ONE OR MORE UL GRANTS IS FOR THE PUSCH WITH UCI, PRIORITIZING THE UL GRANT FOR THE PUSCH WITH UCI BY TAKING INTO ACCOUNT THE PHY PRIORITY OF THE UL GRANT FOR THE PUSCH WITH UCI

720 — THE SELECTING THE UL GRANT FOR TRANSMISSION COMPRISES WITH THE UL GRANT FOR THE PUSCH WITH UCI BEING PRIORITIZED, SELECTING THE UL GRANT FOR TRANSMISSION FROM THE ONE OR MORE UL GRANTS

FIG. 7

UPLINK GRANT PRIORITIZATION ENHANCEMENT

TECHNICAL FIELD

This application relates generally to wireless communication systems, and more specifically to Uplink (UP) grant prioritization enhancement.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); fifth-generation (5G) 3GPP new radio (NR) standard; the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB), which communicate with a wireless communication device, also known as user equipment (UE).

SUMMARY

According to an aspect of the present disclosure, a method is provided for a user equipment (UE) that comprises obtaining one or more indications associated with uplink transmission scheduled by one or more uplink (UL) grants, the one or more UL grants including a UL grant for a physical uplink share channel (PUSCH) with uplink control information (UCI), selecting a UL grant for transmission from the one or more UL grants based at least in part upon the one or more indications, such that the UL grant for the PUSCH with UCI is prioritized for selection, and causing a PUSCH corresponding to the selected UL grant to be transmitted.

According to an aspect of the present disclosure, an apparatus for a user equipment (UE), the apparatus comprises one or more processors configured to perform steps of the method according to any of methods for the UE provided herein.

According to an aspect of the present disclosure, a computer readable medium having computer programs stored thereon which, when executed by one or more processors, cause an apparatus to perform steps of the method according to any of methods provided herein.

According to an aspect of the present disclosure, an apparatus for a communication device, comprising means for performing steps of the method according to any of methods provided herein.

According to an aspect of the present disclosure, a computer program product comprising computer programs which, when executed by one or more processors, cause an apparatus to perform steps of the method according to any of methods provided herein.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure.

FIG. 7 illustrates a flowchart for an exemplary method by a UE in accordance with some embodiments.

DETAILED DESCRIPTION

In the present disclosure, a "base station" can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC), and/or a 5G Node, new radio (NR) node or g Node B (gNB), which communicate with a wireless communication device, also known as user equipment (UE). Although some examples may be described with reference to any of E-UTRAN Node B, an eNB, an RNC and/or a gNB, such devices may be replaced with any type of base station.

Figure 1:
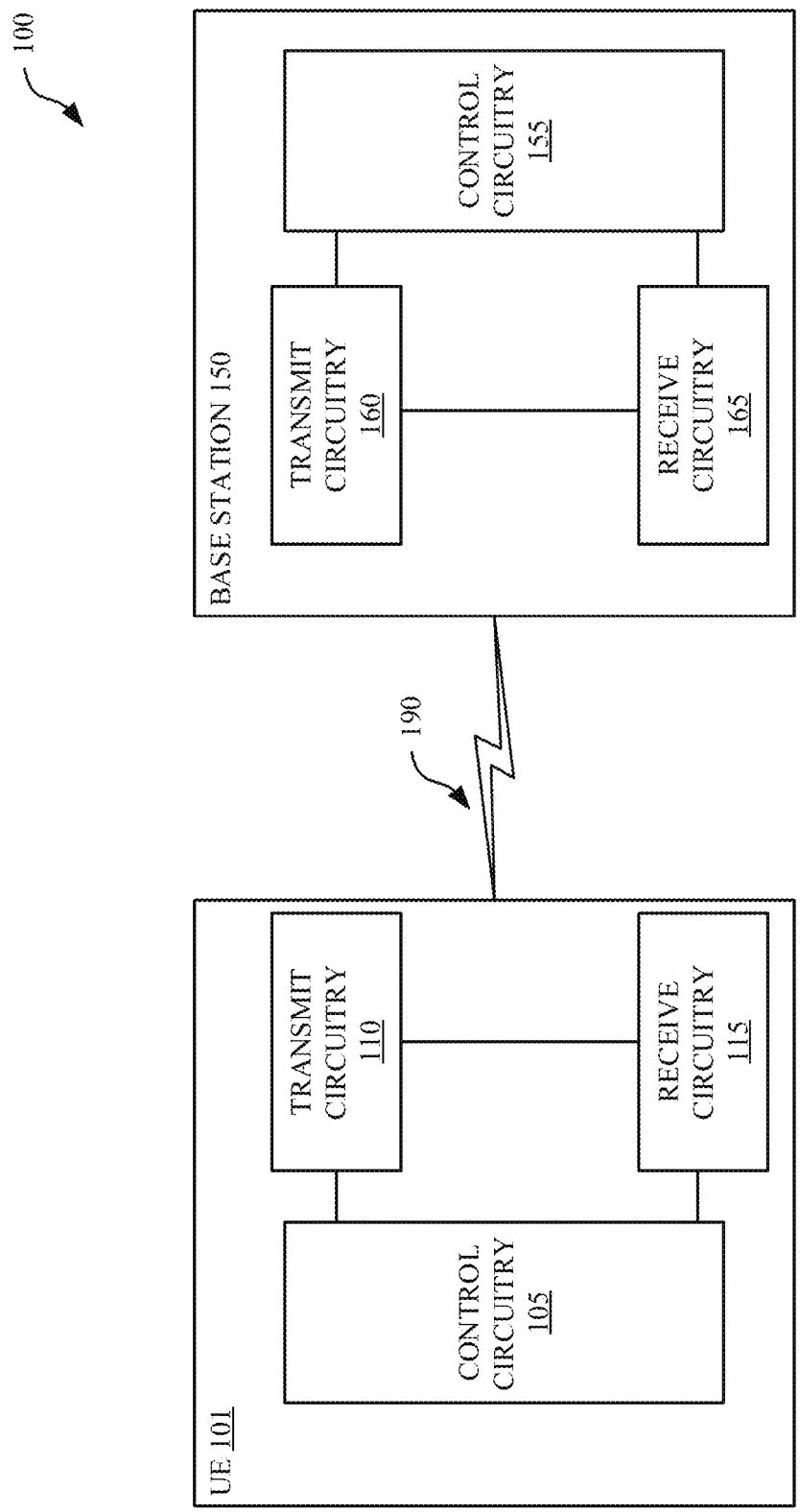
FIG. 1 is a block diagram of a system including a base station and a user equipment (UE) in accordance with some embodiments.

FIG. 1 illustrates a wireless network 100, in accordance with some embodiments. The wireless network 100 includes a UE 101 and a base station 150 connected via an air interface 190.

The UE 101 and any other UE in the system may be, for example, laptop computers, smartphones, tablet computers, printers, machine-type devices such as smart meters or specialized devices for healthcare monitoring, remote security surveillance, an intelligent transportation system, or any other wireless devices with or without a user interface. The base station 150 provides network connectivity to a broader network (not shown) to the UE 101 via the air interface 190 in a base station service area provided by the base station 150. In some embodiments, such a broader network may be a wide area network operated by a cellular network provider, or may be the Internet. Each base station service area associated with the base station 150 is supported by antennas integrated with the base station 150. The service areas are divided into a number of sectors associated with certain antennas. Such sectors may be physically associated with fixed antennas or may be assigned to a physical area with tunable antennas or antenna settings adjustable in a beam-forming process used to direct a signal to a particular sector. One embodiment of the base station 150, for example, includes three sectors each covering a 120 degree area with an array of antennas directed to each sector to provide 360 degree coverage around the base station 150.

The UE 101 includes control circuitry 105 coupled with transmit circuitry 110 and receive circuitry 115. The transmit circuitry 110 and receive circuitry 115 may each be coupled with one or more antennas. The control circuitry 105 may be adapted to perform operations associated with MTC. In some embodiments, the control circuitry 105 of the UE 101 may perform calculations or may initiate measurements associated with the air interface 190 to determine a channel quality of the available connection to the base station 150. These calculations may be performed in conjunction with control circuitry 155 of the base station 150. The transmit circuitry 110 and receive circuitry 115 may be adapted to transmit and receive data, respectively. The control circuitry 105 may be adapted or configured to perform various operations such as those described elsewhere in this disclosure related to a UE. The transmit circuitry 110 may transmit a plurality of multiplexed uplink physical channels. The plurality of uplink physical channels may be multiplexed according to time division multiplexing (TDM) or frequency division multiplexing (FDM). The transmit circuitry 110 may be configured to receive block data from the control circuitry 105 for transmission across the air interface 190. Similarly, the receive circuitry 115 may receive a plurality of multiplexed downlink physical channels from the air interface 190 and relay the physical channels to the control circuitry 105. The uplink and downlink physical channels may be multiplexed according to TDM or FDM. The transmit circuitry 110 and the receive circuitry 115 may transmit and receive both control data and content data (e.g. messages, images, video, et cetera) structured within data blocks that are carried by the physical channels.

FIG. 1 also illustrates the base station 150, in accordance with various embodiments. The base station 150 circuitry may include control circuitry 155 coupled with transmit circuitry 160 and receive circuitry 165. The transmit circuitry 160 and receive circuitry 165 may each be coupled with one or more antennas that may be used to enable communications via the air interface 190.

The control circuity 155 may be adapted to perform operations associated with MTC. The transmit circuitry 160 and receive circuitry 165 may be adapted to transmit and receive data, respectively, within a narrow system bandwidth that is narrower than a standard bandwidth structured for person to person communication. In some embodiments, for example, a transmission bandwidth may be set at or near 1.4 MHz. In other embodiments, other bandwidths may be used. The control circuitry 155 may perform various operations such as those described elsewhere in this disclosure related to a base station.

Within the narrow system bandwidth, the transmit circuitry 160 may transmit a plurality of multiplexed downlink physical channels. The plurality of downlink physical channels may be multiplexed according to TDM or FDM. The transmit circuitry 160 may transmit the plurality of multiplexed downlink physical channels in a downlink super-frame that is comprised of a plurality of downlink subframes.

Within the narrow system bandwidth, the receive circuitry 165 may receive a plurality of multiplexed uplink physical channels. The plurality of uplink physical channels may be multiplexed according to TDM or FDM. The receive circuitry 165 may receive the plurality of multiplexed uplink physical channels in an uplink super-frame that is comprised of a plurality of uplink subframes.

As described further below, the control circuitry 105 and 155 may be involved with measurement of a channel quality for the air interface 190. The channel quality may, for example, be based on physical obstructions between the UE 101 and the base station 150, electromagnetic signal interference from other sources, reflections or indirect paths between the UE 101 and the base station 150, or other such sources of signal noise. Based on the channel quality, a block of data may be scheduled to be retransmitted multiple times, such that the transmit circuitry 110 may transmit copies of the same data multiple times and the receive circuitry 115 may receive multiple copies of the same data multiple times.

Following two cases on dynamic Uplink (UL) skipping were discussed in RAN1. In a case where a Physical Uplink Share Channel (PUSCH) skipping without overlapping CSI/HARQ-ACK on Physical Uplink Control Channel (PUCCH), it was agreed in RAN1 #100-e meeting that when a UL grant without UL-SCH field or UL-SCH=1 (if present) is detected by a UE configured with skipUplinkTxDynamic, the corresponding PUSCH transmission is skipped by the UE if no transport block for the PUSCH transmission is generated by MAC and there is no CS/HARQ-ACK on PUCCH overlapping with the PUSCH.

In a case where PUSCH skipping with overlapping CSI/HARQ-ACK on PUCCH, the UE behavior if there would be a PUCCH with CSI/HARQ-ACK overlapping in time with a PUSCH scheduled by a DC format is not defined in Rel-15. The UE behavior is addressed in Rel-16.

Medium Access Control (MAC) decides during logical channel prioritization (LCP) whether the MAC entity generates a MAC Protocol Data Unit (PDU) or whether MAC PDU generation can be skipped based on skipUplinkTxDynamic. This decision happens after UL grant prioritization, that is, after intra-UE prioritization. Now if an UL grant is for a PUSCH that contains UCI (e.g., CSI/HARQ-ACK as in the second case), according to the current RAN1 design, that PUSCH cannot be skipped. However, this creates a contradiction with intra-UE prioritization in case of overlapping grants.

The PUSCH with multiplexed UCI may not be transmitted. More specifically, the MAC entity may not deliver a corresponding MAC PDU to Physical (PHY) due to de-prioritization of the UL grant by Logical Channel (LCH) based prioritization.

Figure 2:
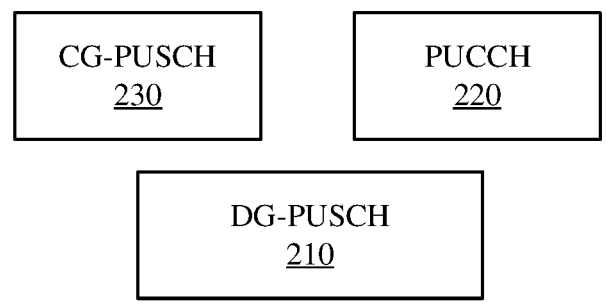
FIG. 2 illustrates an UL skipping scenario with intra-UE prioritization.

FIG. 2 illustrates an UL skipping scenario 200 with intra-UE prioritization. As shown in FIG. 2, a dynamic grant (DG-PUSCH) 210 overlaps with PUCCH 220 and a configured grant (CG-PUSCH) 230 in time.

PHY decides that the Uplink Control Information (UCI) is to be multiplexed into the DG-PUSCH 210 transmission. The PUCCH 220 is not transmitted.

MAC processes the received UL grants. The DG-PUSCH 210 is de-prioritized by LCH-based prioritization. CG-PUSCH 230 is prioritized. A MAC PDU is created for CG-PUSCH 230.

The MAC PDU with UCI is not delivered to PHY. (CG-PUSCH 230 is selected.)

PHY neither transmits the DG-PUSCH 210 with UCI nor the PUCCH 220. UCI transmission is lost.

In some scenarios, If PUSCH with UCI was generally prioritized in MAC as per the requirement from RAN1, potentially many 'empty' PUSCH with multiplexed UCI (but no data) will be transmitted while overlapping PUSCH (with data) is not transmitted. This not only breaks intra-UE prioritization. It can also cause increased power consumption for the UE and increased UL interference for the network.

Figure 3:
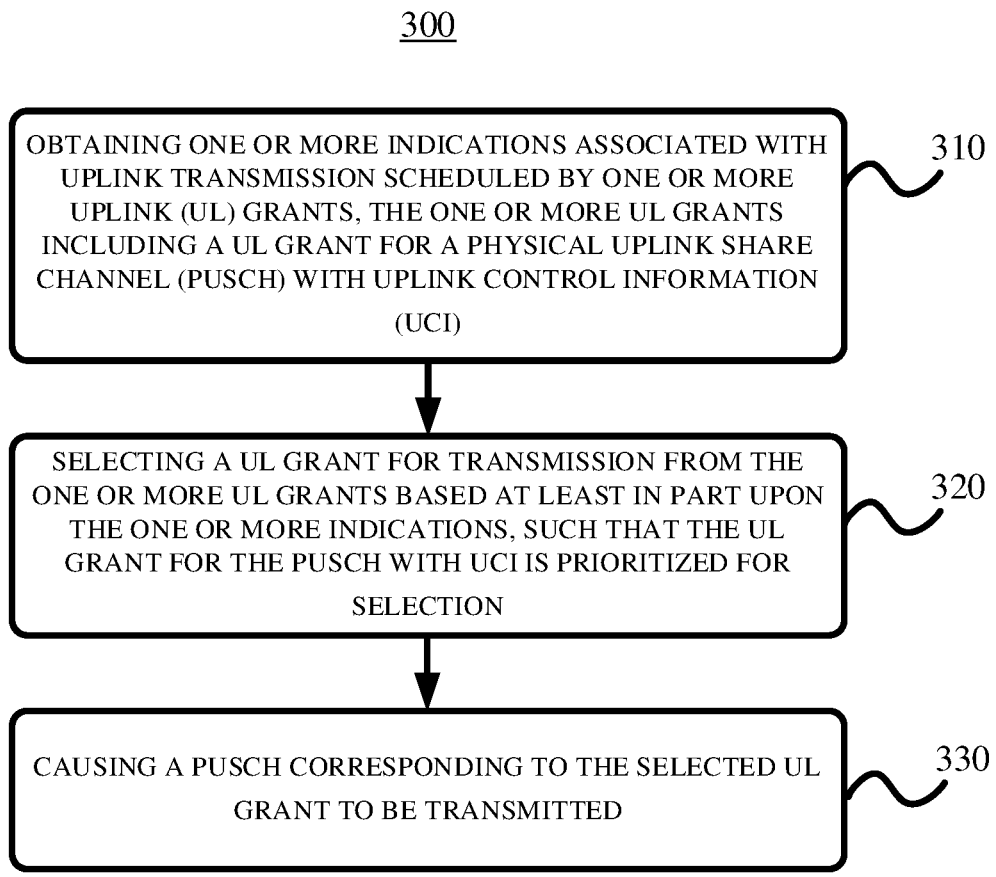
FIG. 3 illustrates a flowchart for an exemplary method by a UE in accordance with some embodiments.

FIG. 3 illustrates a flowchart for an exemplary method 300 by a UE in accordance with some embodiments. As shown in FIG. 3, the method 300 contains step 310 to step 330.

In step 310, a UE obtains one or more indications associated with uplink transmission scheduled by one or more uplink (UL) grants, the one or more UL grants including a UL grant for a physical uplink share channel (PUSCH) with uplink control information (UCI)

In step 320, selecting a UL grant for transmission from the one or more UL grants based at least in part upon the one or more indications, such that the UL grant for the PUSCH with UCI is prioritized for selection.

In step 330, causing a PUSCH corresponding to the selected UL grant to be transmitted.

In some embodiments, each of the one or more indications indicates whether a corresponding one of the one or more UL grants is for the PUSCH with UCI.

In some embodiments, PHY provides the UL Grant to MAC. Following information is indicated:

An indication whether the UL grant is for a PUSCH that is meant to be multiplexed with UCI (as in solutions 1/2). Alternatively, an indication whether the UCI is for HARQ-ACK or CSI (as in solution 1a).

An indication of the PHY-priority (as in solution 3), not only for dynamic grants but also for configured grants.

In some embodiments, MAC selects an UL grant for transmission (TS 38.321, sub-clause 5.4.1). For the UL grant where UCI is multiplexed, MAC considers this UL grant through a number of extra steps in the grant prioritization process, with the several options as below:

Option 1: MAC selects the UL grant based on LCH priority only. The PHY-priority is not considered.
Option 2: MAC updates LCH priority and selects the UL, grant based on LCH priority only. The PHY-priority is not considered. There are several alternatives possible.
Option 3: MAC selects the UL grant based on LCHs with data available. The PHY-priority is not considered.
Option 4: MAC selects the UL grant based on high PHY-priority, and ignores LCH priority.
Option 5: MAC selects the UL grant based on PHY-priority, and updates the LCH priority.

The LCH priority update scheme includes several alternatives.

In some embodiments, MAC assembles the MAC PDU and delivers it to PHY. For options 1-3, MAC may deliver a MAC PDU corresponding to a different UL grant, which was not selected by PHY for UCI transmission. In this case PHY needs to merge the UCI on a different PUSCH for transmission or drop the UCI transmission.

Figure 4A:
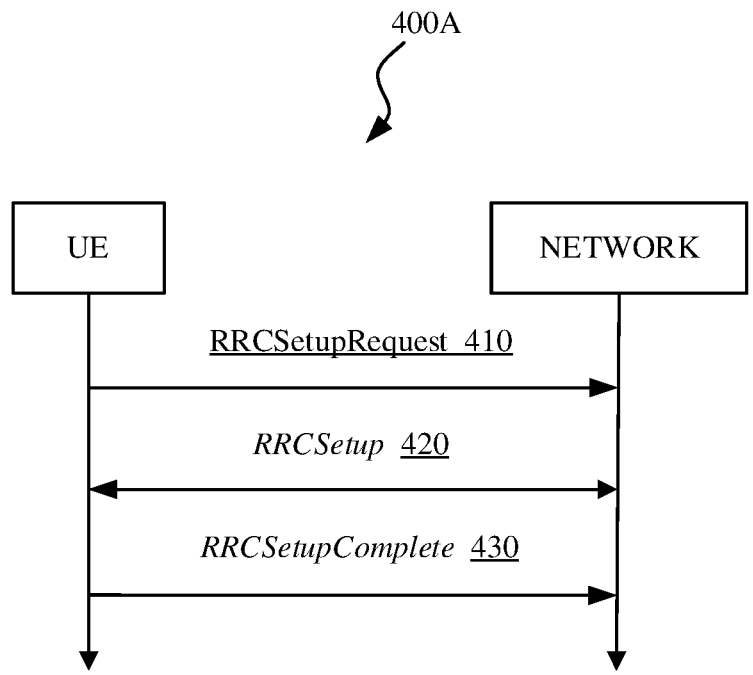
FIG. 4A illustrates an exemplary process of RRC setup.

FIG. 4A illustrates an example process 400A of RRC setup. Referring to FIG. 4A, at step 410, the UE uses time-frequency resources obtained in a random access response (RAR) to send an RRCSetupRequest message, which includes at least the UE identity and the establishment cause. The network (e.g., a gNB) uses a temporary cell-radio network temporary identifier (TC-RNTI) to scramble the physical downlink control channel (PDCCH) of downlink control information (DCI) 1_0 and sends it to the UE, and the UE descrambles to obtain an RRCSetup message at step 320. Then, the network starts preparing to establish the parameters of signalling radio bearer 1 (SRB1). The UE decodes the RRCSetup message to obtain radio bearer related configuration and master cell group information parameters. The RRCSetup message can include the IE MAC-CellGroupConfig as described above. Next, the network uses Cell-RNTI (C-RNTI) to scramble the PDCCH of DCI 0_0 and sends it to the UE. The UE correspondingly descrambles to obtain the time-frequency resources and modulation and coding scheme (MCS) information required to send an RRCSetupComplete message. At step 330, the UE uses the MCS configured by network to send the RRCSetupComplete message at the corresponding time-frequency resource location.

Figure 4B:
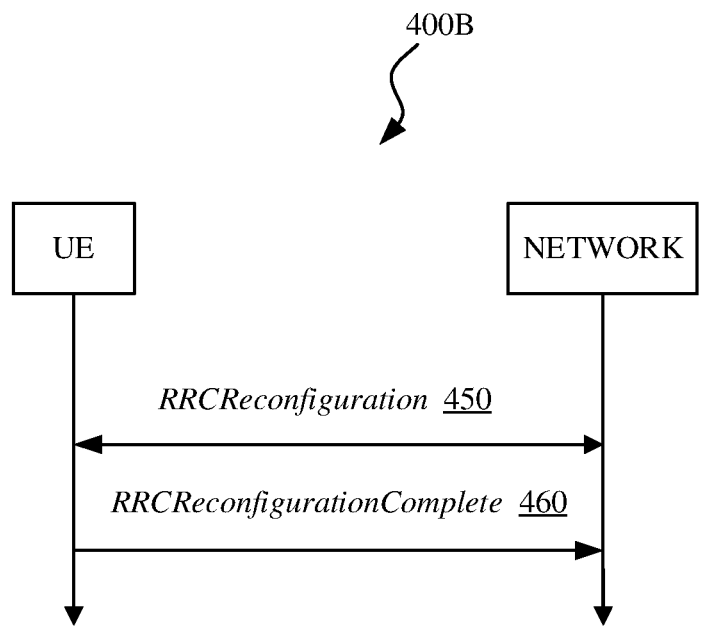
FIG. 4B illustrates an exemplary process of RRC setup.

FIG. 4B illustrates an example process 400B of RRC reconfiguration. Referring to FIG. 4B, at step 450, the network sends an RRCReconfiguration message to the UE. The purpose of the RRCReconfiguration message is to modify the network connection. The operations involved include, but not limited to:

Establishing, modifying and releasing resource block (RB resources;
Creating, modifying and releasing measurements;
Adding, modifying and releasing secondary cell (SCell) and cellGroup;
Adding, modifying and releasing the switch configuration;
Adding, modifying and releasing primary secondary cell (PSCell to change configuration; and
Transmitting of non-access stratum (NAS) layer dedicated information from the network to the UE.

The network configures the UE with master cell group (MCG) and can configure 0 or 1 secondary cell group (SCG). The network provides a configuration parameter CellGroupConfig, which includes the IE MAC-CellGroupConfig as described above.

As shown in the example struct of the IE MAC-CellGroupConfig given above, this IE may include the field lch-BasedPrioritization, which is optionally present. If this field is present, the corresponding MAC entity of the UE is configured with prioritization between overlapping grants and between scheduling request and overlapping grants based on LCH priority, see TS 38.321 [3].

Figure 5:
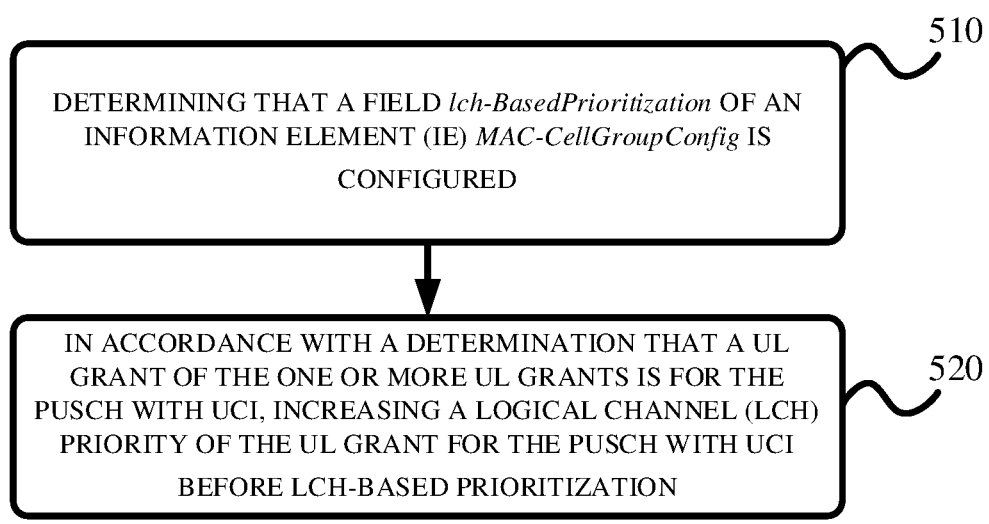
FIG. 5 illustrates a flowchart for an exemplary method by a UE in accordance with some embodiments.

FIG. 5 illustrates a flowchart for an exemplary method 500 by a UE in accordance with some embodiments. As shown in FIG. 5, the method 500 contains step 510 and 520.

In step 510, determining that a field lch-BasedPrioritization of an information element (IE) MAC-CellGroupConfig is configured.

In step 520, in accordance with a determination that a UL grant of the one or more UL grants is for the PUSCH with UCI, increasing a logical channel (LCH) priority of the UL grant for the PUSCH with UCI before LCH-based prioritization.

In addition, the selecting the UL grant for transmission may comprises: with the LCH priority of the UL grant for the PUSCH with UCI being increased, selecting the UL grant for transmission from the one or more UL grants based at least in part upon respective LCH priorities of the one or more UL grants.

In some embodiments, if lch-basedPrioritization is configured, the UE creates a MAC PDU based on the grant with the highest LCH-based priority. This means a grant for PUSCH-with-UCI can get de-prioritized by an overlapping grant mapped to a LCH of higher priority. Method 600 proposes to increase the LCH priority of UL grants for PUSCH-with-UCI according to pre-defined rules, so that a PUSCH-with-UCI gets a higher probability to become the prioritized grant.

It may be achieved by introducing an option to increase the LCH priority level associated with a PUSCH-with-UCI before LCH-based prioritization. The modified priority level is then used (during, e.g., "UL grant reception" in sub-clause 5.4.1 of 38.321, and 38.331).

In some embodiments, the increasing the LCH priority of the UL grant for the PUSCH with UCI may comprises: increasing the LCH priority of an LCH mapped to the PUSCH with UCI by a fixed value.

In some embodiments, the priority level of a logical channel mapped to a PUSCH-with-UCI is increased by a fixed value. The level of adjustment is fixed in the spec, no signaling required.

In some implementations, the increasing the LCH priority of the UL grant for the PUSCH with UCI comprises: increasing the LCH priority of the UL grant for the PUSCH with UCI based upon a parameter received from a network, the parameter representing a modification to the LCH priority of an LCH mapped to the PUSCH with UCI.

In some implementations, the parameter represents a replacement priority of the LCH priority of the LCH mapped to the PUSCH with UCI, the replacement priority being higher than the LCH priority of the LCH mapped to the PUSCH with UCI, and the increasing the LCH priority of the UL grant for the PUSCH with UCI comprises: replacing the LCH priority of the LCH mapped to the PUSCH with UCI with the replacement priority.

In some implementations, the parameter represents an addend to the LCH priority of the LCH mapped to the PUSCH with UCI, and the increasing the LCH priority of the UL grant for the PUSCH with UCI comprises: adding the addend to the LCH priority of the LCH mapped to the PUSCH with UCI to increase the LCH priority of the UL grant for the PUSCH with UCI.

In some variants, the network is allowed to configure a priority adjustment for LCHs carrying PUSCH-with-UCI, with suitable granularity/steps.

In some variant, the priority modification could be done, for example, through following options:
a) A new parameter represents a replacement of the priority level for the logical channel. The modified priority of a LCH mapped to a PUSCH-with-UCI is: priority=uciPriority
b) A new parameter represents an addend to the existing priority level. The priority of a LCH mapped to a PUSCH-with-UCI is: priority=priority−uciPriority.

In some embodiments, the increasing the LCH priority of the UL grant for the PUSCH with UCI comprises: in accordance with a determination that the UL grant for the PUSCH with UCI is a UL grant with LCH data available, maintaining the LCH priority of the UL grant for the PUSCH with UCI, and in accordance with a determination that the UL grant for the PUSCH with UCI is a UL grant with no LCH data available, increasing the LCH priority of the UL grant for the PUSCH with UCI.

In some embodiments, according to 38.321, "the priority of an uplink grant for which no data for logical channels is multiplexed or can be multiplexed in the MAC PDU is lower than either the priority of an uplink grant for which data for any logical channels is multiplexed or can be multiplexed in the MAC PDU or the priority of the logical channel triggering an SR." It might modify the priority level for such 'empty PUSCH' cases only.

In some embodiments, the priority adjustment is only applied for 'empty' PUSCH-with-UCI, that is, for an UL grant with no LCH data available.

After the LCH priority adjustment, if a grant for PUSCH-with-UCI has the same LCH priority as a grant for a PUSCH without UCI (for which the priority is not modified), MAC may allow a grant for PUSCH-with-UCI to take precedence over a PUSCH without UCI. Other variants are possible.

In some embodiments, the new RRC parameter may be as shown with the highlighted part below:

```
LogicalChannelConfig ::=           SEQUENCE {
    ul-SpecificParameters          SEQUENCE {
        priority                       INTEGER (1..16),
        prioritisedBitRate             ENUMERATED {kBps0, kBps8, kBps16,
KBps32, kBps64, kBps128, kBps256, kBps512,
                                           kBps1024, kBps2048, kBps4096,
kBps8192, kBps16384, kBps32768, kBps65536, infinity},
        bucketSizeDuration             ENUMERATED {ms5, ms10, ms20, ms50,
ms100, ms150, ms300, ms500, ms1000,
                                                       spare7, spare6, spare5,
spare4, spare3,spare2, spare1},
        allowedServingCells            SEQUENCE (SIZE (1..maxNrofServingCells-
1)) OF ServCellIndex
OPTIONAL,    -- PDCP-CADuplication
        allowedSCS-List                    SEQUENCE (SIZE (1..maxSCSs)) OF
SubcarrierSpacing                  OPTIONAL,    -- Need R
        maxPUSCH-Duration              ENUMERATED {ms0p02, ms0p04,
ms0p0625, ms0p125, ms0p25, ms0p5, spare2, spare1}
OPTIONAL,    -- Need R
        configuredGrantType1Allowed    ENUMERATED {true}
OPTIONAL,    -- Need R
        logicalChannelGroup            INTEGER (0..maxLCG-ID)
OPTIONAL,    -- Need R
        schedulingRequestID            SchedulingRequestId
OPTIONAL,    -- Need R
        logicalChannelSR-Mask              BOOLEAN,
        logicalChannelSR-DelayTimerApplied BOOLEAN,
        ...,
        bitRateQueryProhibitTimer          ENUMERATED {s0, s0dot4, s0dot8, s1dot6, s3, s6,
s12, s30}    OPTIONAL,              -- Need R
[[
```

```
        allowedCG-List-r16                      SEQUENCE (SIZE (0..
maxNrofConfiguredGrantConfigMAC-r16-1)) OF ConfiguredGrantConfigIndexMAC-r16
OPTIONAL,     -- Need S
        allowedPHY-PriorityIndex-r16            ENUMERATED {p0, p1}
OPTIONAL,     -- Need S
    ]]
    ...,
    [[
        uciPriority-r17                         INTEGER (1..16)
OPTIONAL    -- Need S
    ]]
}
OPTIONAL,     -- Cond UL
    ...,
    [[
    channelAccessPriority-r16                   INTEGER (1..4)
OPTIONAL,     -- Need R
    bitRateMultiplier-r16                       ENUMERATED {x40, x70, x100, x200}
OPTIONAL     -- Need R
    ]]
```

Here, the new parameter is uciPriority-r17. The parameter may be logical channel priority of PUSCH with UCI, as specified in TS 38.321 [3]. Alternatively, it may be an addend to reduce the logical channel priority value for PUSCH with UCI, as specified in TS 38.321 [3].

In some embodiments, the method may further comprises: determining that a field lch-BasedPrioritization of an information element (IE) MAC-CellGroupConfig is configured, and in accordance with a determination that a UL grant of the one or more UL grants is for the PUSCH with UCI, increasing a logical channel (LCH) priority of the UL grant for the PUSCH with UCI before LCH-based prioritization, such that a PUSCH with HARQ-ACK has a higher LCH priority than a PUSCH with CSI. In addition, the selecting the UL grant for transmission comprises: with the LCH priority of the UL grant for the PUSCH with UCI being increased, selecting the UL grant for transmission from the one or more UL grants based at least in part upon respective LCH priorities of the one or more UL grants.

In some embodiments, if lch-basedPrioritization is configured, the UE creates a MAC PDU based on the grant with the highest LCH-based priority. This means a grant for PUSCH-with-UCI can get deprioritized by an overlapping grant mapped to a LCH of higher priority. It is proposed to increase the LCH priority of UL grants for PUSCH-with-UCI according to pre-defined rules, so that a PUSCH-with-UCI gets a higher probability to become the prioritized grant.

In addition, as a further enhancement, MAC can be made aware whether the UCI is for HARQ-ACK or for CSI. MAC can use this information to differentiate LCH based prioritization further. Rationale: UCI for HARQ-ACK may be considered more important than UCI for CSI. If the UCI carries HARQ-ACK and the PUSCH is dropped, DL throughput may be affected. A de-prioritized PUSCH-with-UCI can limit the data rate or make the gNB wait for the HARQ-ACK longer. In turn, dropping a UCI for CSI is less serious.

In some embodiments, the increasing the LCH priority of the UL grant for the PUSCH with UCI comprises: in accordance with a determination that the UCI carries HARQ-ACK, increasing the LCH priority of an LCH mapped to the PUSCH with HARQ-ACK by a first fixed value, and in accordance with a determination that the UCI carries CSI, increasing the LCH priority of an LCH mapped to the PUSCH with CST by a second fixed value. The first fixed value is larger than the second fixed value.

In some embodiments, UCI with HARQ-ACK increases LCH priority level by 2, and UCI with CSI increases it by 1 so that a PUSCH with HARQ-ACK generally has a higher priority than a PUSCH with CSI. Another priority split between HARQ-ACK and CSI is not precluded. The main point is that HARQ-ACK and CSI can have different priority levels. The priority levels are fixed in the spec, no signaling required.

In some embodiments, the increasing the LCH priority of the UL grant for the PUSCH with UCI comprises: in accordance with a determination that the UCI carries HARQ-ACK, increasing the LCH priority of the UL grant for the PUSCH with UCI based upon a first parameter received from a network, the first parameter representing a modification to the LCH priority of an LCH mapped to the PUSCH with HARQ-ACK; and in accordance with a determination that the UCI carries CSI, increasing the LCH priority of the UL grant for the PUSCH with UCI based upon a second parameter received from a network, the second parameter representing a modification to the LCH priority of an LCH mapped to the PUSCH with CSI.

In some embodiments, the network is allowed to configure a priority adjustment for LCHs carrying PUSCH-with-UCI, with suitable granularity/steps. The priority modification could be done, for example, through following options:

A new parameter represents a replacement of the priority level for the logical channel. The modified priority of a LCH mapped to a PUSCH-with-UCI is: priority=uciHarqAckPriority; priority=csiPriority.

A new parameter represents an addend to the existing priority level. The priority of a LCH mapped to a PUSCH-with-UCI is: priority=priority−uciHarqAckPriority; priority=priority−uciCsiPriority; In some embodiments, the first parameter represents a first replacement priority of the LCH priority of the LCH mapped to the PUSCH with HARQ-ACK, the first replacement priority being higher than the LCH priority of the LCH mapped to the PUSCH with HARQ-ACK.

The second parameter represents a second replacement priority of the LCH priority of the LCH mapped to the PUSCH with CSI, the second replacement priority being higher than the LCH priority of the LCH mapped to the PUSCH with CSI.

In addition, the increasing the LCH priority of the UL grant for the PUSCH with UCI comprises: in accordance with a determination that the UCI carries HARQ-ACK, replacing the LCH priority of the LCH mapped to the PUSCH with UCI with the first replacement priority, and in accordance with a determination that the UCI carries CSI, replacing the LCH priority of the LCH mapped to the PUSCH with UCI with the second replacement priority.

In some embodiments, the first parameter represents a first addend to the LCH priority of the LCH mapped to the PUSCH with HARQ-ACK.

The second parameter represents a second addend to the LCH priority of the LCH mapped to the PUSCH with CSI.

In addition, the increasing the LCH priority of the UL grant for the PUSCH with UCI comprises: in accordance with a determination that the UCI carries HARQ-ACK, adding the first addend to the LCH priority of the LCH mapped to the PUSCH with UCI to increase the LCH priority of the UL grant for the PUSCH with UCI, and in accordance with a determination that the UCI carries CSI, adding the second addend to the LCH priority of the LCH mapped to the PUSCH with UCI to increase the LCH priority of the UL grant for the PUSCH with UCI.

In some embodiments, the new RRC parameters, with separate LCH priority levels for HARQ-ACK and CSI, may be as shown in the highlighted part below:

```
LogicalChannelConfig ::=                    SEQUENCE {
    ul-SpecificParameters                   SEQUENCE {
        priority                            INTEGER (1..16),
        prioritisedBitRate                  ENUMERATED {kBps0, kBps8, kBps16, kBps32, kBps64, kBps128, kBps256, kBps512,
                                            kBps1024, kBps2048, kBps4096, kBps8192, kBps16384, kBps32768, kBps65536, infinity},
        bucketSizeDuration                  ENUMERATED {ms5, ms10, ms20, ms50, ms100, ms150, ms300, ms500, ms1000,
                                            spare7, spare6, spare5, spare4, spare3, spare2, spare1},
        allowedServingCells                 SEQUENCE (SIZE (1..maxNrofServingCells-1)) OF ServCellIndex
    OPTIONAL,    -- PDCP-CADuplication
        allowedSCS-List                     SEQUENCE (SIZE (1..maxSCSs)) OF SubcarrierSpacing            OPTIONAL,    -- Need R
        maxPUSCH-Duration                   ENUMERATED {ms0p02, ms0p04, ms0p0625, ms0p125, ms0p25, ms0p5, spare2, spare1}
    OPTIONAL,    -- Need R
        configuredGrantType1Allowed         ENUMERATED    {true}
    OPTIONAL,    -- Need R
        logicalChannelGroup                 INTEGER (0..maxLCG-ID)
    OPTIONAL,    -- Need R
        schedulingRequestID                                     SchedulingRequestId
    OPTIONAL,    -- Need R
        logicalChannelSR-Mask               BOOLEAN,
        logicalChannelSR-DelayTimerApplied  BOOLEAN,
        ...,
        bitRateQueryProhibitTimer           ENUMERATED {s0, sodot4, s0dot8, s1dot6, s3, s6, s12, s30}   OPTIONAL,    -- Need R
        [[
        allowedCG-List-r16                                      SEQUENCE (SIZE (0..maxNrofConfiguredGrantConfigMAC-r16-1)) OF ConfiguredGrantConfigIndexMAC-r16
    OPTIONAL, -- Need S
        allowedPHY-PriorityIndex-r16        ENUMERATED    {p0, p1}
    OPTIONAL,    -- Need S
        ]]
        ...,
        [[
        uciHarqAckPriority-r17                                  INTEGER (1..16)
    OPTIONAL,    -- Need S
        uciCsiPriority-r17                                      INTEGER (1..16)
    OPTIONAL    -- Need S
        ]]
    }
    OPTIONAL,    -- Cond UL
    ...,
    [[
    channelAccessPriority-r16                                   INTEGER (1..4)
    OPTIONAL,    -- Need R
    bitRateMultiplier-r16                   ENUMERATED {x40, x70, x100, x200}
    OPTIONAL,    -- Need R
    ]]
}
```

Here, the new parameters are uciHarqAckPriority and uciCsiPriority. The parameter uciHarqAckPriority may be logical channel priority of PUSCH with UCI for HARQ-ACK, as specified in TS 38.321 [3]. Alternatively, it may be an addend to reduce the logical channel priority value for PUSCH with UCI for HARQ-ACK, as specified in TS 38.321 [3]. Furthermore, the parameter uciCsiPriority may be logical channel priority of PUSCH with UCI for CSI, as specified in TS 38.321 [3]. Alternatively, it may be an addend to reduce the logical channel priority value for PUSCH with UCI for CSI, as specified in TS 38.321 [3].

In some embodiments, the increasing the LCH priority of the UL grant for the PUSCH with UCI comprises: in accordance with a determination that the UL grant for the PUSCH with UCI is a UL grant with LCH data available, maintaining the LCH priority of the UL grant for the PUSCH with UCI, and in accordance with a determination that the UL grant for the PUSCH with UCI is a UL grant with no LCH data available, increasing the LCH priority of the UL grant for the PUSCH with UCI.

In some embodiments, according to 38.321, "the priority of an uplink grant for which no data for logical channels is multiplexed or can be multiplexed in the MAC PDU is lower than either the priority of an uplink grant for which data for any logical channels is multiplexed or can be multiplexed in the MAC PDU or the priority of the logical channel triggering an SR." It may modify the priority level for such empty PUSCH cases only.

In some embodiments, the priority adjustment is only applied for 'empty' PUSCH-with-UCI, that is, for an UL grant with no LCH data available.

After the LCH priority adjustment, if a grant for PUSCH-with-UCI has the same LCH priority as a grant for a PUSCH without UCI, MAC may allow a grant for PUSCH-with-UCI to take precedence over a PUSCH without UCI. Other variants are possible, for example, only HARQ-ACK may be allowed to take precedence.

Figure 6:
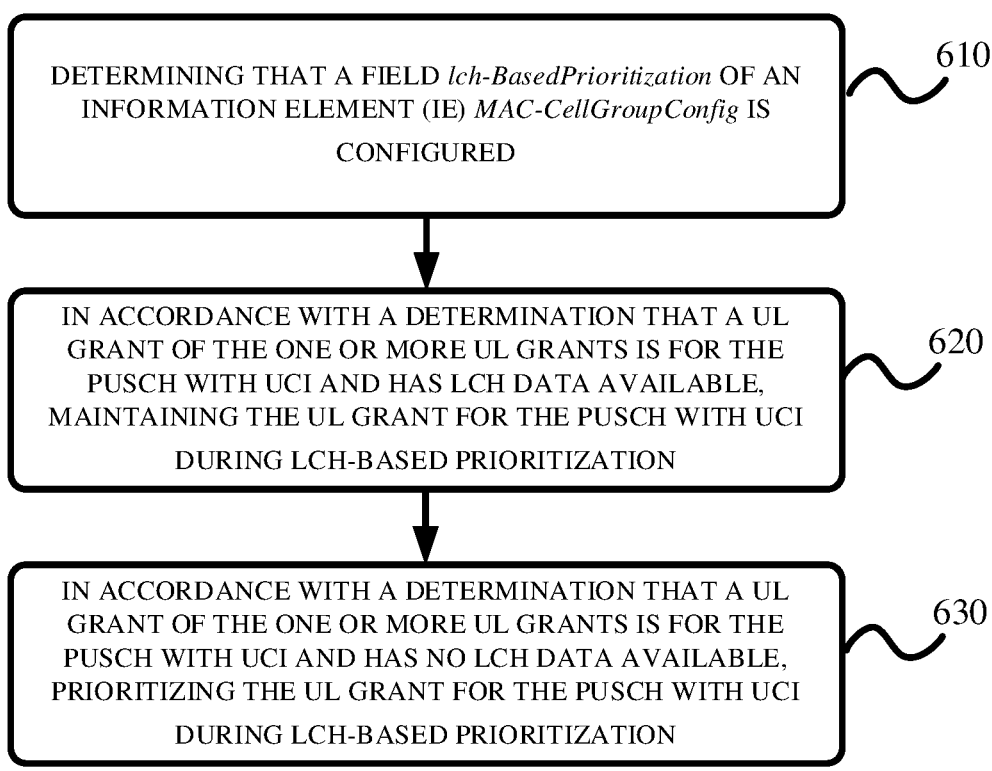
FIG. 6 illustrates a flowchart for an exemplary method by a UE in accordance with some embodiments.

FIG. 6 illustrates a flowchart for an exemplary method 600 by a UE in accordance with some embodiments. In FIG. 6, method 700 comprises step 610 to 630.

In step 610, determining that a field lch-BasedPrioritization of an information element (UE) MAC-CellGroupConfig is configured.

In step 620, in accordance with a determination that a UL grant of the one or more UL grants is for the PUSCH with UCI and has LCH data available, maintaining the UL grant for the PUSCH with UCI during LCH-based prioritization.

In step 630, in accordance with a determination that a UL grant of the one or more UL grants is for the PUSCH with UCI and has no LCH data available, prioritizing the UL grant for the PUSCH with UCI during LCH-based prioritization.

In addition, the selecting the UL grant for transmission comprises selecting the prioritized UL, grant as the UL grant for transmission.

In some embodiments, if lch-basedPrioritization is configured, the UE creates a MAC PDU based on the grant with the highest LCH-based priority. This means a grant for PUSCH-with-UCI can get de-prioritized by an overlapping grant mapped to a LCH of higher priority. It is proposed to prioritize PUSCH-with-UCI when the LCH has data available. An UL grant mapped to PUSCH-with-UCI for which LCH data is available is always prioritized (it becomes the prioritized grant). However, an UL grant mapped to PUSCH-with-UCI for which no LCH data is available is not treated differently from any other grant. With that, lch-basedPrioritization is modified for LCHs with data available only.

In some embodiments, each of the one or more indications indicates a physical layer (PHY) priority of a corresponding one of the one or more UL grants.

FIG. 7 illustrates a flowchart for an exemplary method 700 by a UE in accordance with some embodiments. As shown in FIG. 7, method 700 comprise step 710 and 720.

In step 710, in accordance with a determination that a UL grant of the one or more UL grants is for the PUSCH with UCI, prioritizing the UL grant for the PUSCH with UCI by taking into account the PHY priority of the UL grant for the PUSCH with UCI.

In step 720, the selecting the UL grant for transmission comprises: with the UL grant for the PUSCH with UCI being prioritizing, selecting the UL grant for transmission from the one or more UL grants.

In some embodiments, the PHY priority is one selected from a group consisting of a first PHY priority and a second PHY priority, the first PHY priority being higher than the second PHY

PRIORITY

The prioritizing the LCH priority of the UL grant for the PUSCH with UCI comprises: in accordance with a determination that the PUSCH with UCI has the first PHY priority, prioritizing, during LCH-based prioritization, the UL grant for the PUSCH with UCI to be such a prioritized UL grant that the PUSCH with UCI cannot be skipped.

In addition, the selecting the UL grant for transmission comprises selecting the prioritized UL grant as the UL grant for transmission.

In some embodiments, MAC prioritizes PUSCH with UCI by taking into account the PHY priority. The method may builds upon the assumption that MAC can receive a PHY-priority indication (e.g. as pan of the UL grant) not only for dynamic grants but also for configured grants.

MAC procedures for UL grant processing then consider accordingly the PHY priority In some embodiments, if UCI is to be multiplexed on a PUSCH of high PHY priority, the grant is treated as a prioritized grant and the PUSCH cannot be skipped. Currently the PHY priority is not considered during LCH-based prioritization.

In some embodiments, the prioritizing of the LCH priority of the UL grant for the PUSCH with UCI is only allowed for a subset of PHY priority levels.

In some embodiments, the prioritizing the LCH priority of the UL grant for the PUSCH with UCI comprises: in accordance with a determination that a restriction, indicating that the prioritizing of the LCH priority of the UL grant for the PUSCH with UCI is only allowed for the subset of PHY priority levels, is received from a network and that the PHY priority of the UL grant for the PUSCH with UCI falls within the subset of PHY priority levels, increasing the LCH priority of the UL grant for the PUSCH with UCI before LCH-based prioritization.

In some embodiments, modification of LCH priority for PUSCH-with-UCI is only allowed for certain (or all) PHY priority levels. The network can configure restrictions, for example, whether uciPriority/uciHarqAckPriority/uciCsiPriority am applicable to a certain PHY priority level only. As a result, the LCH priority adjustment is applied to UL grants (for PUSCH with UCI) of the allowed priority level only.

In some embodiments, the new RRC parameter with LCH to PHY priority mapping may be as shown in the highlighted part below:

```
LogicalChannelConfig ::=        SEQUENCE {
    ul-SpecificParameters           SEQUENCE {
        priority                        INTEGER (1..16),
        prioritisedBitRate              ENUMERATED {kBps0, kBps8, kBps16,
```

```
        kBps32, kBps64, kBps128, kBps256, kBps512,
                                                kBps1024, kBps2048, kBps4096,
kBps8192, kBps16384, kBps32768, kBps65536, infinity},
            bucketSizeDuration                  ENUMERATED {ms5, ms10, ms20, ms50,
ms100, ms150, ms300, ms500, ms1000,
                                                                spare7, spare6, spare5,
spare4, spare3, spare2, spare1},
            allowedServingCells                 SEQUENCE (SIZE (1..maxNrofServingCells-
1)) OF ServCellIndex
OPTIONAL,    -- PDCP-CADuplication
            allowedSCS-List                     SEQUENCE (SIZE (1..maxSCSs)) OF
SubcarrierSpacing                       OPTIONAL,    -- Need R
            maxPUSCH-Duration                   ENUMERATED {ms0p02, ms0p04,
ms0p0625, ms0p125, ms0p25, ms0p5, spare2, spare1}
OPTIONAL, -- Need R
            configuredGrantType1Allowed         ENUMERATED {true}
OPTIONAL,    -- Need R
            logicalChannelGroup                 INTEGER (0..maxLCG-ID)
OPTIONAL,    -- Need R
            schedulingRequestID                 SchedulingRequestId
OPTIONAL,    -- Need R
            logicalChannelSR-Mask                BOOLEAN,
            logicalChannelSR-DelayTimerApplied  BOOLEAN,
            ...,
            bitRateQueryProhibitTimer           ENUMERATED {s0, s0dot4, s0dot8, sldot6, s3, s6,
s12, s30}   OPTIONAL,                   -- Need R
        [[
            allowedCG-List-r16                  SEQUENCE (SIZE (0..
maxNrofConfiguredGrantConfigMAC-r16-1)) OF ConfiguredGrantConfigIndexMAC-r16
OPTIONAL,    -- Need S
            allowedPHY-PriorityIndex-r16        ENUMERATED {p0, p1}
OPTIONAL,    -- Need S
        ]]
        ...,
        [[
            rankedUciPHY-PriorityIndex-r17      ENUMERATED {p0, p1}
OPTIONAL,    -- Need S
        ]]
    }
OPTIONAL,    -- Cond UL
    ...,
    [[
        channelAccessPriority-r16               INTEGER (1..4)
OPTIONAL,    -- Need R
        bitRateMultiplier-r16                   ENUMERATED {x40, x70, x100, x200}
OPTIONAL     -- Need R
    ]]
}
```

Here, the new parameter is rankedUciPHY-PriorityIndex-r17, which indicates a PHY priority level that is applicable when UCI is multiplexed on a PUSCH. MAC applies special treatment as part of UL grant selection/prioritization. This can be combined with uciPriority/uciHarqAckPriority/uciC-siPriority mentioned earlier. In addition, the approach/parameters then need to be referenced in the MAC spec.

In some embodiments, the prioritizing the LCH priority of the UL grant for the PUSCH with UCI comprises increasing, before LCH-based prioritization, the LCH priority of the UL grant for the PUSCH with UCI by different values depending upon the PHY priority of the UL grant for the PUSCH with UCI.

In some embodiments, modification of LCH priority for PUSCH-with-UCI can be differentiated based on PHY priority level.

In some embodiments, the method further comprises maintaining a plurality of sets of LCH priority modification parameters, each set for a corresponding one of a plurality of PHY priority levels.

In addition, the increasing the LCH priority of the UL grant for the PUSCH with UCI comprises increasing the LCH priority of the UL grant for the PUSCH with UCI using a corresponding set of LCH priority modification parameters corresponding to the PHY priority of the UL grant for the PUSCH with UCI.

In some embodiments, the UE has two sets of uciPriority/uciHarqAckPriority/uciCsiPriority, one for each PHY priority level.

In some embodiments, the new RRC parameter with LCH to PHY priority mapping may be as shown in the highlighted part below:

```
            LogicalChannelConfig ::=            SEQUENCE {
                ul-SpecificParameters           SEQUENCE {
                    priority                        INTEGER (1..16),
                    prioritisedBitRate              ENUMERATED {kBps0, kBps8, kBps16,
kBps32, kBps64, kBps128, kBps256, kBps512,
                                                kBps1024, kBps2048, kBps4096,
kBps8192, kBps16384, KBps32768, kBps65536, infinity},
```

```
    bucketSizeDuration                     ENUMERATED {ms5, ms10, ms20, ms50,
ms100, ms150, ms300, ms500, ms1000,
                                                                spare7, spare6, spare5,
spare4, spare3,spare2, spare1},
    allowedServingCells                    SEQUENCE (SIZE (1..maxNrofServingCells-
1)) OF ServCellIndex
OPTIONAL,   -- PDCP-CADuplication
    allowedSCS-List                        SEQUENCE (SIZE (1..maxSCSs)) OF
SubcarrierSpacing                          OPTIONAL,   -- Need R
    maxPUSCH-Duration                      ENUMERATED {ms0p02, ms0p04,
ms0p0625, ms0p125, ms0p25, ms0p5, spare2, spare1}
OPTIONAL,   -- Need R
    configuredGrantType1Allowed            ENUMERATED {true}
OPTIONAL,   -- Need R
    logicalChannelGroup                    INTEGER (0..maxLCG-ID)
OPTIONAL,   -- Need R
    schedulingRequestID                    Scheduling RequestId
OPTIONAL,   -- Need R
    logicalChannelSR-Mask                      BOOLEAN,
    logicalChannelSR-DelayTimerApplied     BOOLEAN,
    ...,
    bitRateQueryProhibitTimer              ENUMERATED {s0, sodot4, s0dot8, sldot6, s3, s6,
s12, s30}       OPTIONAL,                  -- Need R
    [[
    allowedCG-List-r16                     SEQUENCE (SIZE (0..
maxNrofConfiguredGrantConfigMAC-r16-1)) OF ConfiguredGrantConfigIndexMAC-r16
OPTIONAL, -- Need S
    allowedPHY-PriorityIndex-r16           ENUMERATED {p0, p1}
OPTIONAL, -- Need S
    ]]
    ...,
    [[
    uciHarqAckPriorityP0-r17               INTEGER (1..16)
OPTIONAL,    -- Need S
    uciHarqAckPriorityP1-r17               INTEGER (1..16)
OPTIONAL,    -- Need S
    uciCsiPriorityP0-r17                   INTEGER (1..16)
OPTIONAL     -- Need S
    uciCsiPriorityP1-r17                   INTEGER (1..16)
OPTIONAL     -- Need S
    ]]
    }
OPTIONAL,    -- Cond UL
    ...,
    [[
    channelAccessPriority-r16              INTEGER (1..4)
OPTIONAL,    -- Need R
    bitRateMultiplier-r16                  ENUMERATED {x40, x70, x100, x200}
OPTIONAL     -- Need R
    ]]
}
```

Here, the new parameters are with separate LCH priority levels for HARQ-ACK/CSI and for each PHY priority level. —uciHarqAckPriority/uciCsiPriority may be defined either as a full priority level or as an addend to parameter priority.

The uciHarqAckPriorityP0 may indicates logical channel priority of PUSCH with UCI for HARQ-ACK at low PHY priority, as specified in TS 38.321 [3]. Also, the uciCsiPriorityP0 nay indicates logical channel priority of PUSCH with UCI for CSI at low PHY priority, as specified in TS 38.321 [3].

Alternatively, uciHarqAckPriorityP1 may indicates addend to reduce the logical channel priority value for PUSCH with HARQ-ACK in UCI (to increase the priority level) and at high PHY priority, as specified in TS 38.321 [3]. Also, the uciCsiPriorityP1 may indicates addend to reduce the logical channel priority value for PUSCH with CSI in UCI (to increase the priority level) and at high PHY priority, as specified in TS 38.321 [3].

In some embodiments, parameters can be organized differently in a separate struct or using enums.

In some embodiments, each PHY priority corresponds to a corresponding LCH priority level, and the increasing the LCH priority of the UL grant for the PUSCH with UCI comprises modifying the LCH priority of the UL grant for the PUSCH with UCI to the corresponding LCH priority level based upon the PHY priority of the UL grant for the PUSCH with UCI.

In some embodiments, PHY and LCH priority levels are fixed in the spec.

Figure 8:
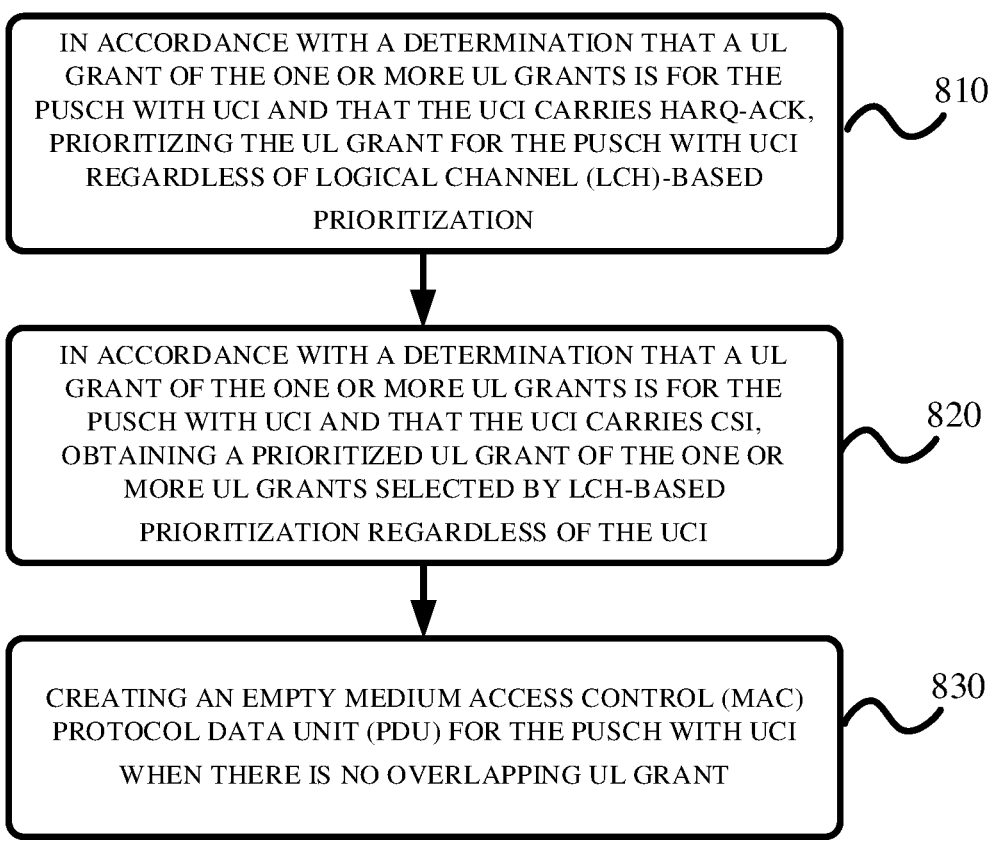
FIG. 8 illustrates a flowchart for an exemplary method by a UE in accordance with some embodiments.

It is noted that other combinations where the PHY priority is used for prioritization of PUSCH-with-UCI as part of the decision process are not precluded. Furthermore, this solution can be applied even when lch-basedPrioritization is not enabled and only PHY-based prioritization is enabled FIG. 8 illustrates a flowchart for an exemplary method 800 by a UE in accordance with some embodiments. As shown in FIG. 8, the method 800 comprises step 810 to 830.

In step 810, in accordance with a determination that a UL grant of the one or more UL grants is for the PUSCH with UCI and that the UCI carries HARQ-ACK, prioritizing the UL grant for the PUSCH with UCI regardless of logical channel (LCH)-based prioritization; and In step 820, in accordance with a determination that a UL grant of the one or more UL grants is for the PUSCH with UCI and that the UCI carries CSI:

obtaining a prioritized UL grant of the one or more UL grants selected by LCH-based prioritization regardless of the UCI; and In step 830, creating an empty medium access control (MAC) protocol data unit (PDU) for the PUSCH with UCI when there is no overlapping UL grant.

In addition, the selecting the UL grant for transmission comprises: selecting the prioritized UL grant as the UL grant for transmission.

In some embodiments, the prioritizing the UL grant for the PUSCH with UCI regardless of LCH-based prioritization comprises: in accordance with a determination that there is no overlapping PUSCH of higher physical layer (PHY) priority than the PHY priority of the UL grant for the PUSCH with UCI, prioritizing the UL grant for the PUSCH with UCI regardless of LCH-based prioritization.

In some embodiments, UCI with HARQ-ACK and UCI with CSI can be separately indicated to MAC. MAC can prioritize UCI with HARQ-ACK and/or handle UCI with CST. To avoid breaking PHY-prioritization, some embodiments could be applied only if there is no overlapping PUSCH of higher PHY priority.

In some embodiments, the method further comprises: in accordance with a determination that the one or more UL grants overlap in time domain, creating a MAC PDU for a UL grant of the one or more UL grants that is not selected for transmission, and merging the UCI onto the PUSCH corresponding to the selected UL grant for transmission.

In some embodiments, some methods where PHY multiplexes/updates UCI after MAC has selected a grant and created a MAC PDU. When PHY indicates multiple overlapping UL grants to MAC, where one of them has UCI, MAC may deliver a MAC PDU corresponding to an UL grant which was not selected by PHY for UCI transmission. In this case PHY needs to merge the UCI on a different PUSCH for transmission or drop the UCI transmission.

Figure 9:
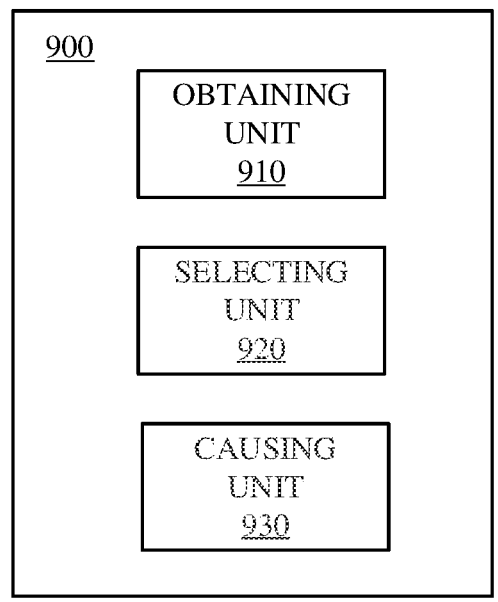
FIG. 9 illustrates an exemplary block diagram of an apparatus for a UE in accordance with some embodiments.

FIG. 9 illustrates an exemplary block diagram of an apparatus 900 for a UE in accordance with some embodiments. The apparatus 900 illustrated in FIG. 9 may be used to implement the method 300 as illustrated in combination with FIG. 3.

As shown in FIG. 9, the apparatus 900 includes obtaining unit 910, selecting unit 920 and causing unit 930.

The obtaining unit 910 may be configured to obtain one or more indications associated with uplink transmission scheduled by one or more uplink (UL) grants, the one or more UL grants including a UL grant for a physical uplink share channel (PUSCH) with uplink control information (UCI)

Figure 10:
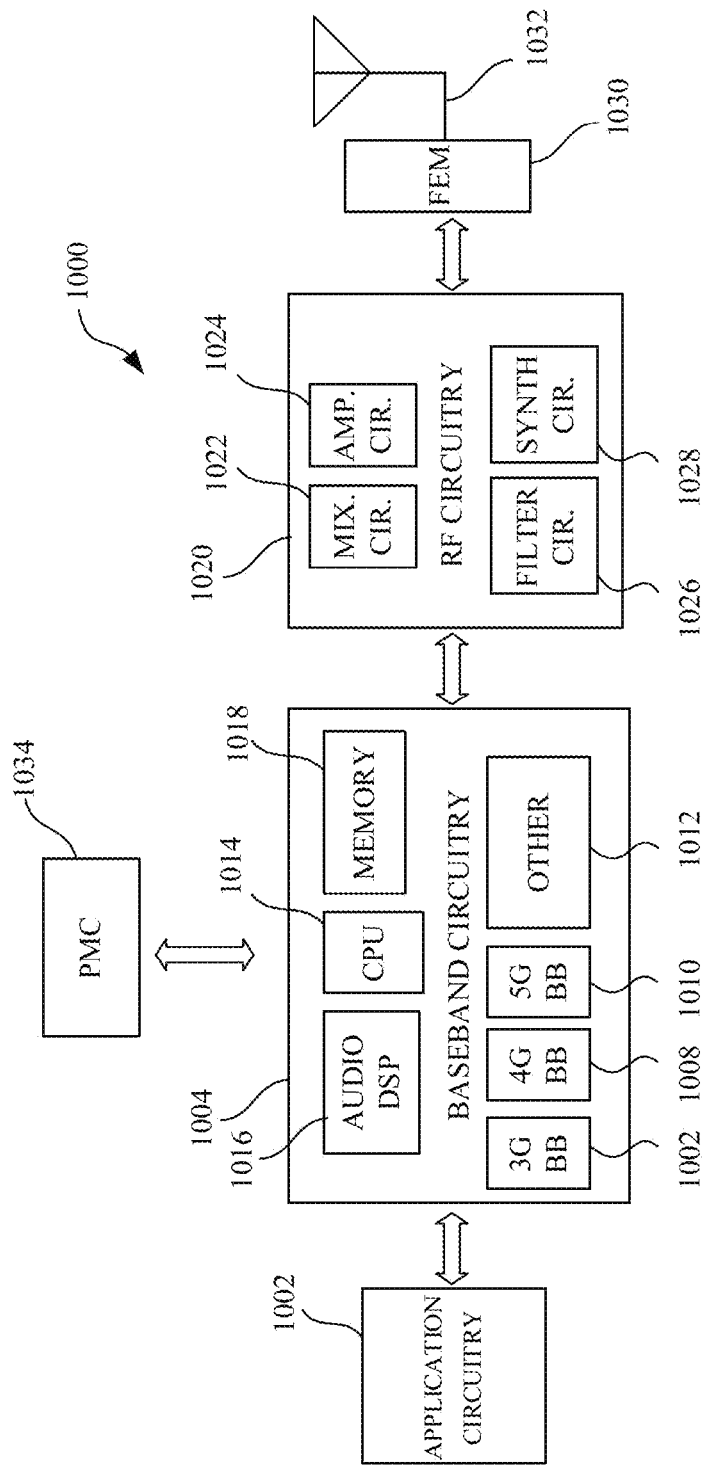
FIG. 10 illustrates example components of a device in accordance with some embodiments.

The selecting unit 920 may be configured to select a UL grant for transmission from the one or more UL grants based at least in part upon the one or more indications, such that the UL grant for the PUSCH with UCI is prioritized for selection The causing unit 930 may be configured to cause a PUSCH corresponding to the selected UL grant to be transmitted FIG. 10 illustrates example components of a device 1000 in accordance with some embodiments. In some embodiments, the device 1000 may include application circuitry 1002, baseband circuitry 1004. Radio Frequency (RF) circuitry (shown as RF circuitry 1020), front-end module (FEM) circuitry (shown as FEM circuitry 1030), one or more antennas 1032, and power management circuitry (PMC) (shown as PMC 1034) coupled together at least as shown. The components of the illustrated device 1000 may be included in a UE or a RAN node. In some embodiments, the device 1000 may include fewer elements (e.g., a RAN node may not utilize application circuitry 1002, and instead include a processor/controller to process IP data received from an EPC). In some embodiments, the device 1000 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1002 may include one or more application processors. For example, the application circuitry 1002 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1000. In some embodiments, processors of application circuitry 1002 may process IP data packets received from an EPC.

The baseband circuitry 1004 may include circuitry such as, but not limited to, one or more single-core or multi-core processors. The baseband circuitry 1004 may include one or more baseband processors or control logic to process baseband signals received from a receive signal path of the RF circuitry 1020 and to generate baseband signals for a transmit signal path of the RF circuitry 1020. The baseband circuitry 1004 may interface with the application circuitry 1002 for generation and processing of the baseband signals and for controlling operations of the RF circuitry 1020. For example, in some embodiments, the baseband circuitry 1004 may include a third generation (3G) baseband processor (3G baseband processor 1006), a fourth generation (4G) baseband processor (4G baseband processor 1008), a fifth generation (5G) baseband processor (5G baseband processor 1010), or other baseband processors) 1012 for other existing generations, generations in development or to be developed in the future (e.g., second generation (2G), sixth generation (6G), etc.). The baseband circuitry 1004 (e.g., one or more of baseband processors) may handle various radio control functions that enable communication with one or more radio networks via the RF circuitry 1020. In other embodiments, some or all of the functionality of the illustrated baseband processors may be included in modules stored in the memory 1018 and executed via a Central Processing ETnit (CPET 1014). The radio control functions may include, but are not limited to, signal modulation/demodulation, encoding/decoding, radio frequency shifting, etc. In some embodiments, modulation/demodulation circuitry of the baseband circuitry 1004 may include Fast-Fourier Transform (FFT), precoding, or constellation mapping/demapping functionality. In some embodiments, encoding/decoding circuitry of the baseband circuitry 1004 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1004 may include a digital signal processor (DSP), such as one or more audio DSP(s) 1016. The one or more audio DSP(s) 1016 may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1004 and the application circuitry 1002 may be implemented together such as, for example, on a system on a chip (SOC).

In some embodiments, the baseband circuitry 1004 may provide for communication compatible with one or more radio technologies. For example, in some embodiments, the baseband circuitry 1004 may support communication with an evolved universal terrestrial radio access network (EUTRAN) or other wireless metropolitan area networks (WMAN), a wireless local area network (WLAN), or a wireless personal area network (WPAN). Embodiments in which the baseband circuitry 1004 is configured to support radio communications of more than one wireless protocol may be referred to as multi-mode baseband circuitry.

The RF circuitry 1020 may enable communication with wireless networks using modulated electromagnetic radiation through a non-solid medium. In various embodiments, the RF circuitry 1020 may include switches, filters, amplifiers, etc. to facilitate the communication with the wireless network. The RF circuitry 1020 may include a receive signal path which may include circuitry to down-convert RF signals received from the FEM circuitry 1030 and provide baseband signals to the baseband circuitry 1004. The RF circuitry 1020 may also include a transmit signal path which may include circuitry to up-convert baseband signals provided by the baseband circuitry 1004 and provide RF output signals to the FEM circuitry 1030 for transmission. In some embodiments, the receive signal path of the RF circuitry 1020 may include mixer circuitry 1022, amplifier circuitry 1024 and filter circuitry 1026. In some embodiments, the transmit signal path of the RF circuitry 1020 may include filter circuitry 1026 and mixer circuitry 1022. The RF circuitry 1020 may also include synthesizer circuitry 1028 for synthesizing a frequency for use by the mixer circuitry 1022 of the receive signal path and the transmit signal path. In some embodiments, the mixer circuitry 1022 of the receive signal path may be configured to down-convert RF signals received from the FEM circuitry 1030 based on the synthesized frequency provided by synthesizer circuitry 1028. The amplifier circuitry 1024 may be configured to amplify the down-converted signals and the filter circuitry 1026 may be a low-pass filter (LPF) or band-pass filter (BPF) configured to remove unwanted signals from the down-converted signals to generate output baseband signals. Output baseband signals may be provided to the baseband circuitry 1004 for further processing. In some embodiments, the output baseband signals may be zero-frequency baseband signals, although this is not a requirement. In some embodiments, the mixer circuitry 1022 of the receive signal path may comprise passive mixers, although the scope of the embodiments is not limited in this respect.

In some embodiments, the mixer circuitry 1022 of the transmit signal path may be configured to up-convert input baseband signals based on the synthesized frequency provided by the synthesizer circuitry 1028 to generate RF output signals for the FEM circuitry 1030. The baseband signals may be provided by the baseband circuitry 1004 and may be filtered by the filter circuitry 1026.

In some embodiments, the mixer circuitry 1022 of the receive signal path and the mixer circuitry 1022 of the transmit signal path may include two or more mixers and may be arranged for quadrature downconversion and upconversion, respectively. In some embodiments, the mixer circuitry 1022 of the receive signal path and the mixer circuitry 1022 of the transmit signal path may include two or more mixers and may be arranged for image rejection (e.g., Hartley image rejection). In some embodiments, the mixer circuitry 1022 of the receive signal path and the mixer circuitry 1022 may be arranged for direct downconversion and direct upconversion, respectively. In some embodiments, the mixer circuitry 1022 of the receive signal path and the mixer circuitry 1022 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1020 may include analog-to-digital converter (ADC) and digital-to-analog converter (DAC) circuitry and the baseband circuitry 1004 may include a digital baseband interface to communicate with the RF circuitry 1020.

In some dual-mode embodiments, a separate radio IC circuitry may be provided for processing signals for each spectrum, although the scope of the embodiments is not limited in this respect.

In some embodiments, the synthesizer circuitry 1028 may be a fractional –N synthesizer or a fractional N/N+1 synthesizer, although the scope of the embodiments is not limited in this respect as other types of frequency synthesizers may be suitable. For example, synthesizer circuitry 1028 may be a delta-sigma synthesizer, a frequency multiplier, or a synthesizer comprising a phase-locked loop with a frequency divider.

The synthesizer circuitry 1028 may be configured to synthesize an output frequency for use by the mixer circuitry 1022 of the RF circuitry 1020 based on a frequency input and a divider control input. In some embodiments, the synthesizer circuitry 1028 may be a fractional N/N+1 synthesizer.

In some embodiments, frequency input may be provided by a voltage controlled oscillator (VCO), although that is not a requirement. Divider control input may be provided by either the baseband circuitry 1004 or the application circuitry 1002 (such as an applications processor) depending on the desired output frequency. In some embodiments, a divider control input (e.g., N) may be determined from a look-up table based on a channel indicated by the application circuitry 1002.

Synthesizer circuitry 1028 of the RF circuitry 1020 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 1028 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1020 may include an IQ/polar converter.

The FEM circuitry 1030 may include a receive signal path which may include circuitry configured to operate on RF signals received from one or more antennas 1032, amplify the received signals and provide the amplified versions of the received signals to the RF circuitry 1020 for further processing. The FEM circuitry 1030 may also include a transmit signal path which may include circuitry configured to amplify signals for transmission provided by the RF circuitry 1020 for transmission by one or more of the one or more antennas 1032. In various embodiments, the amplification through the transmit or receive signal paths may be done solely in the RF circuitry 1020, solely in the FEM circuitry 1030, or in both the RF circuitry 1020 and the FEM circuitry 1030.

In some embodiments, the FEM circuitry 1030 may include a TX/RX switch to switch between transmit mode and receive mode operation. The FEM circuitry 1030 may include a receive signal path and a transmit signal path. The receive signal path of the FEM circuitry 1030 may include an LNA to amplify received RF signals and provide the amplified received RF signals as an output (e.g., to the RF circuitry 1020). The transmit signal path of the FEM circuitry 1030 may include a power amplifier (PA) to amplify input RF signals (e.g., provided by the RF circuitry 1020), and one or more filters to generate RF signals for subsequent transmission (e.g., by one or more of the one or more antennas 1032).

In some embodiments, the PMC 1034 may manage power provided to the baseband circuitry 1004. In particular, the PMC 1034 may control power-source selection, voltage scaling, battery charging, or DC-to-DC conversion. The PMC 1034 may often be included when the device 1000 is capable of being powered by a battery, for example, when the device 1000 is included in a EGE. The PMC 1034 may increase the power conversion efficiency while providing desirable implementation size and heat dissipation characteristics.

FIG. 10 shows the PMC 1034 coupled only with the baseband circuitry 1004. However, in other embodiments, the PMC 1034 may be additionally or alternatively coupled with, and perform similar power management operations for, other components such as, but not limited to, the application circuitry 1002, the RF circuitry 1020, or the FEM circuitry 1030.

In some embodiments, the PMC 1034 may control, or otherwise be part of, various power saving mechanisms of the device 1000. For example, if the device 1000 is in an RRC Connected state, where it is still connected to the RAN node as it expects to receive traffic shortly, then it may enter a state known as Discontinuous Reception Mode (DRX) after a period of inactivity. During this state, the device 1000 may power down for brief intervals of time and thus save power.

If there is no data traffic activity for an extended period of time, then the device 1000 may transition off to an RRC Idle state, where it disconnects from the network and does not perform operations such as channel quality feedback, handover, etc. The device 1000 goes into a very low power state and it performs paging where again it periodically wakes up to listen to the network and then powers down again. The device 1000 may not receive data in this state, and in order to receive data, it transitions back to an RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1002 and processors of the baseband circuitry 1004 may be used to execute elements of one or more instances of a protocol stack. For example, processors of the baseband circuitry 1004, alone or in combination, may be used to execute Layer 3, Layer 2, or Layer 1 functionality, while processors of the application circuitry 1002 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 11:
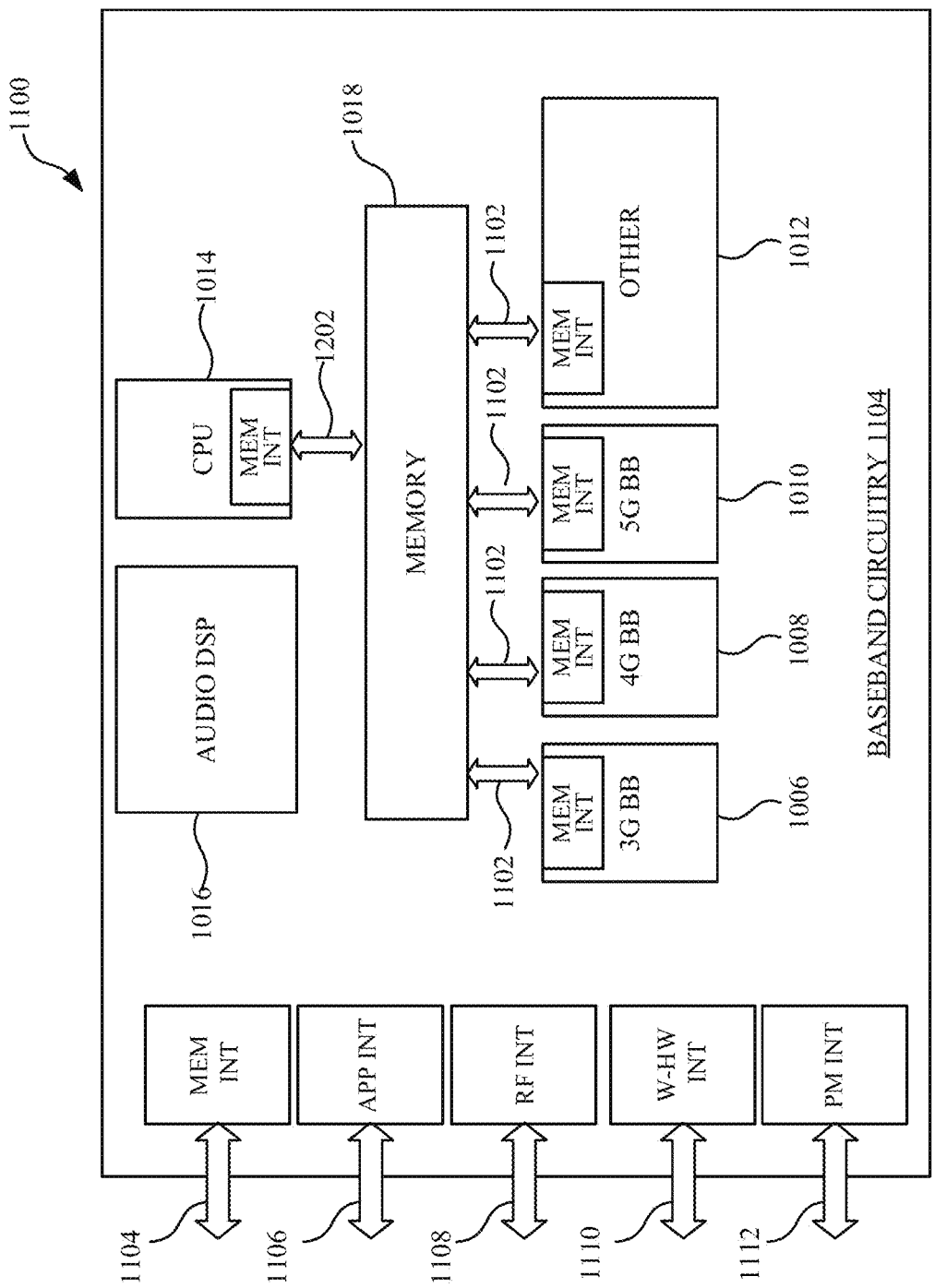
FIG. 11 illustrates example interfaces of baseband circuitry in accordance with some embodiments.

FIG. 11 illustrates example interfaces 1100 of baseband circuitry in accordance with some embodiments. As discussed above, the baseband circuitry 1004 of FIG. 10 may comprise 3G baseband processor 1006, 4G baseband processor 1108, 50 baseband processor 1010, other baseband processor(s) 1012, CPU 1014, and a memory 1118 utilized by said processors. As illustrated, each of the processors may include a respective memory interface 1102 to send/receive data to/from the memory 1118.

The baseband circuitry 1004 may further include one or more interfaces to communicatively couple to other circuitries/devices, such as a memory interface 1104 (e.g., an interface to send/receive data to/from memory external to the baseband circuitry 1104), an application circuitry interface 1106 (e.g., an interface to send/receive data to/from the application circuitry 1102 of FIG. 11), an RF circuitry interface 1108 (e.g., an interface to send/receive data to/from RF circuitry 1020 of FIG. 10), a wireless hardware connectivity interface 1110 (e.g., an interface to send/receive data to/from Near Field Communication (NFC) components, Bluetooth® components (e.g., Bluetooth® Low Energy), Wi-Fi® components, and other communication components), and a power management interface 1112 (e.g., an interface to send/receive power or control signals to/from the PMC 1024.

Figure 12:
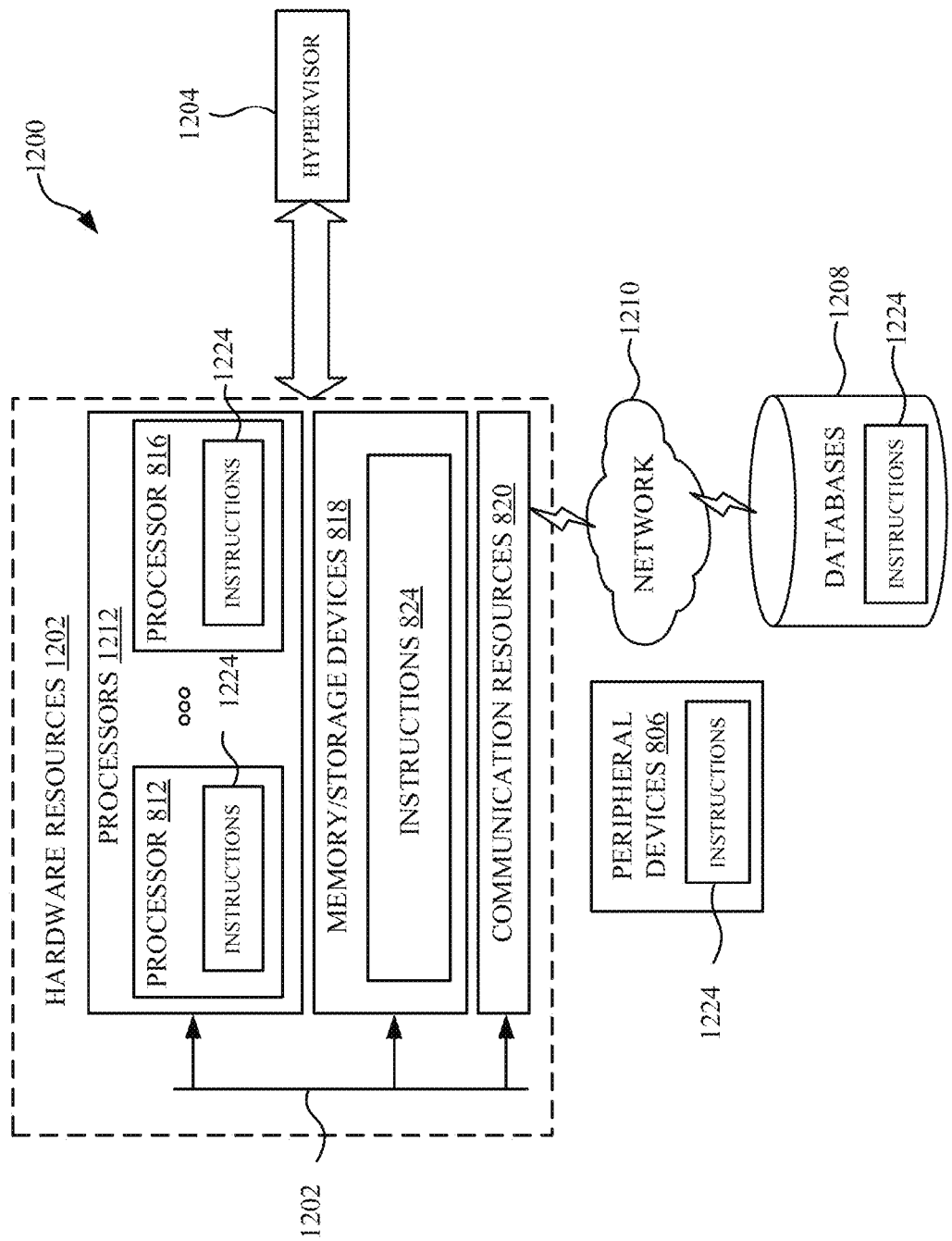
FIG. 12 illustrates components in accordance with some embodiments.

FIG. 12 is a block diagram illustrating components 1200, according to some example embodiments, able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1202 including one or more processors 1212 (or processor cores), one or more memory/storage devices 1218, and one or more communication resources 1220, each of which may be communicatively coupled via a bus 1222. For embodiments where node virtualization (e.g., NFV) is utilized, a hypervisor 1204 may be executed to provide an execution environment for one or more network slices/sub-slices to utilize the hardware resources 1202.

The processors 1212 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1214 and a processor 1216.

The memory/storage devices 1218 may include main memory, disk storage, or any suitable combination thereof. The memory/storage devices 1218 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1220 may include interconnection or network interface components or other suitable devices to communicate with one or more peripheral devices 1206 or one or more databases 1208 via a network 1210. For example, the communication resources 1220 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1224 may comprise software, a program, an application, an applet, an app, or other executable code for causing at least any of the processors 1212 to perform any one or more of the methodologies discussed herein. The instructions 1224 may reside, completely or partially, within at least one of the processors 1212 (e.g., within the processor's cache memory), the memory/storage devices 1218, or any suitable combination thereof. Furthermore, any portion of the instructions 1224 may be transferred to the hardware resources 1202 from any combination of the peripheral devices 1206 or the databases 1208. Accordingly, the memory of the processors 1212, the memory/storage devices 1218, the peripheral devices 1206, and the databases 1208 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Figure 13:
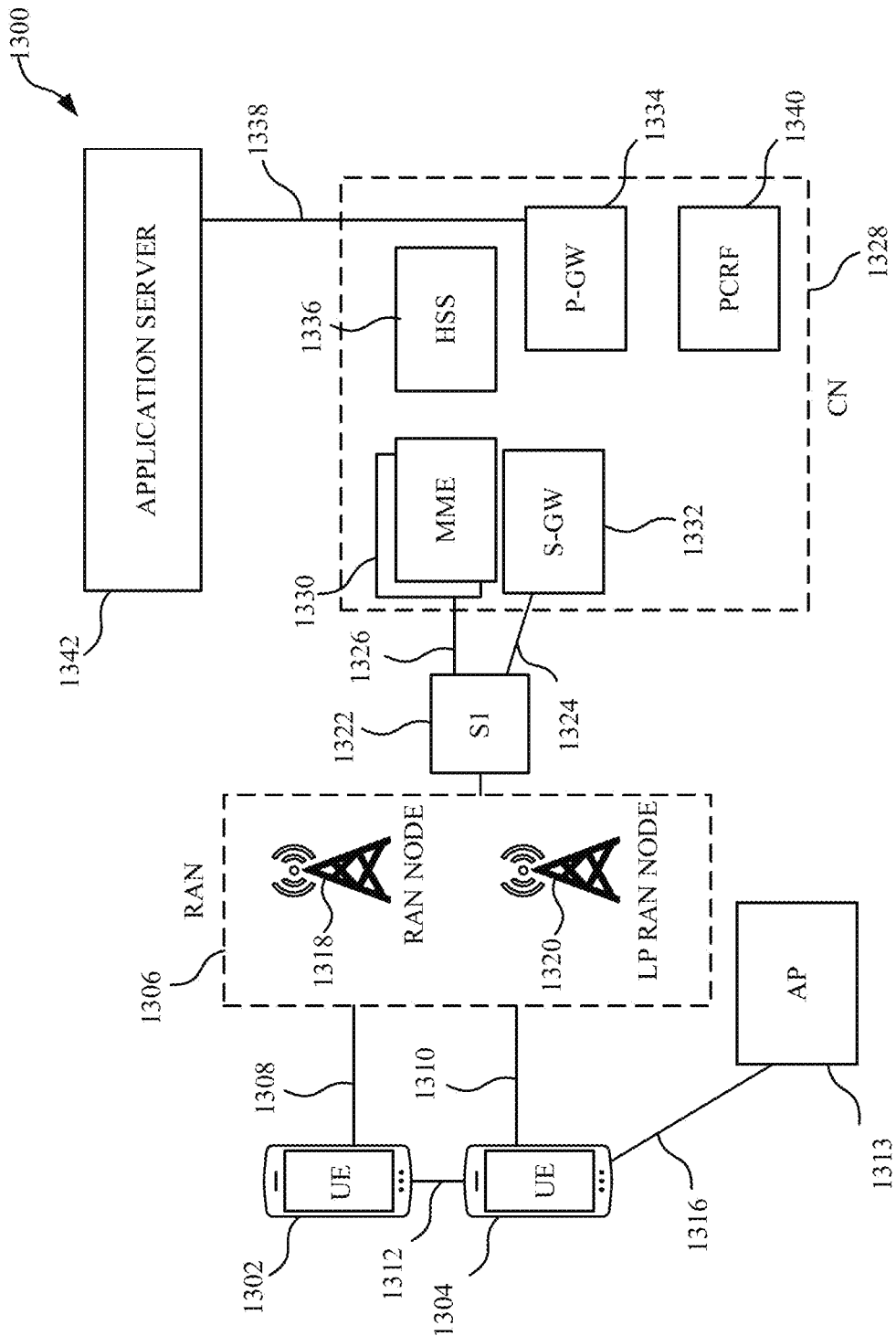
FIG. 13 illustrates an architecture of a wireless network in accordance with some embodiments.

FIG. 13 illustrates an architecture of a system 1300 of a network in accordance with some embodiments. The system 1300 includes one or more user equipment (UE), shown in this example as a UE 1302 and a UE 1304. The UE 1302 and the UE 1304 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UE 1302 and the UE 1104 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. The UE 1302 and the UE 1304 may be configured to connect, e.g., communicatively couple, with a radio access network (RAN), shown as RAN 1306. The RAN 1306 may be, for example, an Evolved ETniversal Mobile Telecommunications System (ETMTS) Terrestrial Radio Access Network (E-UTRAN), a NextGen RAN (NG RAN), or some other type of RAN. The UE 1302 and the UE 1304 utilize connection 1308 and connection 1310, respectively, each of which comprises a physical communications interface or layer (discussed in further detail below); in this example, the connection 1308 and the connection 1310 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a FIT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UE 1302 and the UE 1304 may further directly exchange communication data via a ProSe interface 1312. The ProSe interface 1312 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1304 is shown to be configured to access an access point (AP), shown as AP 1134, via connection 1316. The connection 1316 can comprise a local wireless connection, such as a connection consistent with any IEEE 802.13 protocol, wherein the AP 1314 would comprise a wireless fidelity (WiFi®) router. In this example, the AP 1314 may be connected to the Internet without connecting to the core network of the wireless system (described in further detail below).

The RAN 1306 can include one or more access nodes that enable the connection 1308 and the connection 1310. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1306 may include one or more RAN nodes for providing macrocells, e.g., macro RAN node 1318, and one or more RAN nodes for providing femtocells or picocells (e.g., cells having smaller coverage areas, smaller user capacity, or higher bandwidth compared to macrocells), e.g., a low power (LP) RAN node such as LP RAN node 1320. Any of the macro RAN node 1318 and the LP RAN node 1320 can terminate the air interface protocol and can be the first point of contact for the UE 1302 and the UE 1304. In some embodiments, any of the macro RAN node 1318 and the LP RAN node 1320 can fulfill various logical functions for the RAN 1306 including, but not limited to, radio network controller (RNC) functions such as radio bearer management, uplink and downlink dynamic radio resource management and data packet scheduling, and mobility management.

In accordance with some embodiments, the EGE 1302 and the EGE 1304 can be configured to communicate using Orthogonal Frequency-Division Multiplexing (OFDM) communication signals with each other or with any of the macro RAN node 1318 and the LP RAN node 1320 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal sub carriers.

In some embodiments, a downlink resource grid can be used for downlink transmissions from any of the macro RAN node 1318 and the LP RAN node 1320 to the UE 1302 and the UE 1304, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements: in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 1302 and the UE 1304. The physical downlink control channel (PDCCH) may carry information about the transport format and resource allocations related to the PDSCH channel, among other things. It may also inform the UE 1302 and the UE 1304 about the transport format, resource allocation, and H-ARQ (Hybrid Automatic Repeat Request) information related to the uplink shared channel. Typically, downlink scheduling (assigning control and shared channel resource blocks to the LE 1304 within a cell) may be performed at any of the macro RAN node 1318 and the LP RAN node 1320 based on channel quality information fed back from any of the UE 1302 and UE 1304. The downlink resource assignment information may be sent on the PDCCH used for (e.g., assigned to) each of the UE 1302 and the UE 1304.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. Theme can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 1306 is communicatively coupled to a core network (CN), shown as CN 1328—via an S1 interface 1322. In embodiments, the CN 1328 may be an evolved packet core (EPC) network, a NextGen Packet Core (NPC) network, or some other type of CN. In this embodiment the S1 interface 1322 is split into two parts: the S1-U interface 1324, which carries traffic data between the macro RAN node 1318 and the LP RAN node 1320 and a serving gateway (S-GW), shown as S-GW 1132, and an S1-mobility management entity (MME) interface, shown as S1-MME interface 1326, which is a signaling interface between the macro RAN node 1318 and LP RAN node 1320 and the MME(s) 1330. In this embodiment, the CN 1328 comprises the MME(s) 1330, the S-GW 1332, a Packet Data Network (PDN) Gateway (P-GW) (shown as P-GW 1334), and a home subscriber server (HSS) (shown as HSS 1336). The MME(s) 1330 may be similar in function to the control plane of legacy Serving General Packet Radio Service (GPRS) Support Nodes (SGSN). The MME(s) 1330 may manage mobility aspects in access such as gateway selection and tracking area list management. The HSS 1336 may comprise a database for network users, including subscription-related information to support the network entities' handling of communication sessions. The CN 1328 may comprise one or several HSS 1336, depending on the number of mobile subscribers, on the capacity of the equipment, on the organization of the network, etc. For example, the HSS 1336 can provide support for routing/roaming, authentication, authorization, naming/addressing resolution, location dependencies, etc.

The S-GW 1332 may terminate the S1 interface 322 towards the RAN 1306, and routes data packets between the RAN 1306 and the CN 1328. In addition, the S-GW 1332 may be a local mobility anchor point for inter-RAN node handovers and also may provide an anchor for inter-3 GPP mobility. Other responsibilities may include lawful intercept, charging, and some policy enforcement.

The P-GW 1334 may terminate an SGi interface toward a PDN. The P-GW 1334 may route data packets between the CN 1328 (e.g., an EPC network) and external networks such as a network including the application server 1342 (alternatively referred to as application function (AF)) via an Internet Protocol t IP) interface (shown as IP communications interface 1338). Generally, an application server 1342 may be an element offering applications that use IP bearer resources with the core network (e.g., ETMTS Packet Services (PS) domain, LTE PS data services, etc.). In this embodiment, the P-GW 1334 is shown to be communicatively coupled to an application server 1342 via an IP communications interface 1338. The application server 1342 can also be configured to support one or more communication services (e.g., Voice-over-Internet Protocol (VoIP) sessions, PTT sessions, group communication sessions, social networking services, etc.) for the UE 1302 and the UE 1304 via the CN 1328.

The P-GW 1334 may further be a node for policy enforcement and charging data collection. A Policy and Charging Enforcement Function (PCRF) (shown as PCRF 1340) is the policy and charging control element of the CN 1328. In a non-roaming scenario, there may be a single PCRF in the Home Public Land Mobile Network (HPLMN) associated with a ETE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1340 may be communicatively coupled to the application server 1342 via the P-GW 1334. The application server 1342 may signal the PCRF 1340 to indicate a new service flow and select the appropriate Quality of Service (QoS) and charging parameters. The PCRF 1340 may provision this rule into a Policy and Charging Enforcement Function t PCEF) (not shown) with the appropriate traffic flow template (TFT) and QoS class of identifier (QCI), which commences the QoS and charging as specified by the application server 1342.

ADDITIONAL EXAMPLES

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The following examples pertain to further embodiments.

Example 1 is a method for a user equipment (UE), comprising:
obtaining one or more indications associated with uplink transmission scheduled by one or more uplink WIL) grants, the one or more UL grants including a UL grant for a physical uplink share channel (PUSCH) with uplink control information (UCI);
selecting a UL grant for transmission from the one or more UL grants based at least in part upon the one or more indications, such that the UL grant for the PUSCH with UCI is prioritized for selection; and
causing a PUSCH corresponding to the selected UL grant to be transmitted.

Example 2 is the method of example 1, wherein each of the one or more indications indicates whether a corresponding one of the one or more UL grants is for the PUSCH with UCI.

Example 3 is the method of example 2, further comprising:
determining that a field lch-BasedPrioritization of an information element (IE) MAC-CellGroupConfig is configured; and
in accordance with a determination that a UL grant of the one or more UL grants is for the PUSCH with UCI, increasing a logical channel (LCH) priority of the UL grant for the PUSCH with UCI before LCH-based prioritization,
wherein the selecting the UL grant for transmission comprises:
with the LCH priority of the UL grant for the PUSCH with UCI being increased, selecting the UL grant for transmission from the one or more UL grants based at least in part upon respective LCH priorities of the one or more UL grants.

Example 4 is the method of example 3, wherein the increasing the LCH priority of the UL grant for the PUSCH with UCI comprises:
increasing the LCH priority of an LCH mapped to the PUSCH with UCI by a fixed value.

Example 5 is the method of example 3, wherein the increasing the LCH priority of the UL grant for the PUSCH with UCI comprises:
increasing the LCH priority of the UL grant for the PUSCH with UCI based upon a parameter received from a network, the parameter representing a modification to the LCH priority of an LCH mapped to the PUSCH with UCI.

Example 6 is the method of example 5,
wherein the parameter represents a replacement priority of the LCH priority of the LCH mapped to the PUSCH with UCI, the replacement priority being higher than the LCH priority of the LCH mapped to the PUSCH with UCI, and
wherein the increasing the LCH priority of the UL grant for the PUSCH with UCI comprises: replacing the LCH priority of the LCH mapped to the PUSCH with UCI with the replacement priority.

Example 7 is the method of example 5,
wherein the parameter represents an addend to the LCH priority of the LCH mapped to the PUSCH with UCI, and
wherein the increasing the LCH priority of the UL grant for the PUSCH with UCI comprises: adding the addend to the LCH priority of the LCH mapped to the PUSCH with UCI to increase the LCH priority of the UL grant for the PUSCH with UCI.

Example 8 is the method of any one of examples 3-7, wherein the increasing the LCH priority of the UL grant for the PUSCH with UCI comprises:
in accordance with a determination that the UL grant for the PUSCH with UCI is a UL grant with LCH data available, maintaining the LCH priority of the UL grant for the PUSCH with UCI; and
in accordance with a determination that the UL grant for the PUSCH with UCI is a UL grant with no LCH data available, increasing the LCH priority of the UL grant for the PUSCH with UCI.

Example 9 is the method of example 1, wherein the one or more indications include an indication that indicates whether the UCI carries hybrid automatic repeat request acknowledgement (HARQ-ACK) or channel state information (CST).

Example 10 is the method of example 9, further comprising:
  determining that a field lch-BasedPrioritization of an information element (IE) MAC-CellGroupConfig is configured; and
  in accordance with a determination that a UL grant of the one or more UL grants is for the PUSCH with UCI, increasing a logical channel (LCH) priority of the UL grant for the PUSCH with UCI before LCH-based prioritization, such that a PUSCH with HARQ-ACK has a higher LCH priority than a PUSCH with CST,
  wherein the selecting the UL grant for transmission comprises:
  with the LCH priority of the UL grant for the PUSCH with UCI being increased, selecting the UL grant for transmission from the one or more UL grants based at least in part upon respective LCH priorities of the one or more UL grants.

Example 11 is the method of example 10, wherein the increasing the LCH priority of the UL grant for the PUSCH with UCI comprises:
  in accordance with a determination that the UCI carries HARQ-ACK, increasing the LCH priority of an LCH mapped to the PUSCH with HARQ-ACK by a first fixed value; and
  in accordance with a determination that the UCI carries CSI, increasing the LCH priority of an LCH mapped to the PUSCH with CSI by a second fixed value,
  wherein the first fixed value is larger than the second fixed value.

Example 12 is the method of example 10, wherein the increasing the LCH priority of the UL grant for the PUSCH with UCI comprises:
  in accordance with a determination that the UCI carries HARQ-ACK, increasing the LCH priority of the UL grant for the PUSCH with UCI based upon a first parameter received from a network, the first parameter representing a modification to the LCH priority of an LCH mapped to the PUSCH with HARQ-ACK; and
  in accordance with a determination that the UCI carries CSI, increasing the LCH priority of the UL grant for the PUSCH with UCI based upon a second parameter received from a network, the second parameter representing a modification to the LCH priority of an LCH mapped to the PUSCH with CSI.

Example 13 is the method of example 12,
  wherein the first parameter represents a first replacement priority of the LCH priority of the LCH mapped to the PUSCH with HARQ-ACK, the first replacement priority being higher than the LCH priority of the LCH mapped to the PUSCH with HARQ-ACK,
  wherein the second parameter represents a second replacement priority of the LCH priority of the LCH mapped to the PUSCH with CSI, the second replacement priority being higher than the LCH priority of the LCH mapped to the PUSCH with CSI, and
  wherein the increasing the LCH priority of the UL grant for the PUSCH with UCI comprises: in accordance with a determination that the UCI carries HARQ-ACK, replacing the LCH priority of the LCH mapped to the PUSCH with UCI with the first replacement priority; and
  in accordance with a determination that the UCI carries CSI, replacing the LCH priority of the LCH mapped to the PUSCH with UCI with the second replacement priority.

Example 14 is the method of example 12,
  wherein the first parameter represents a first addend to the LCH priority of the LCH mapped to the PUSCH with HARQ-ACK,
  wherein the second parameter represents a second addend to the LCH priority of the LCH mapped to the PUSCH with CSI, and
  wherein the increasing the LCH priority of the UL grant for the PUSCH with UCI comprises: in accordance with a determination that the UCI carries HARQ-ACK, adding the first addend to the LCH priority of the LCH mapped to the PUSCH with UCI to increase the LCH priority of the UL grant for the PUSCH with UCI; and
  in accordance with a determination that the UCI carries CSI, adding the second addend to the LCH priority of the LCH mapped to the PUSCH with UCI to increase the LCH priority of the UL grant for the PUSCH with UCI.

Example 15 is the method of any one of examples 10-14, wherein the increasing the LCH priority of the UL grant for the PUSCH with UCI comprises:
  in accordance with a determination that the UL grant for the PUSCH with UCI is a UL grant with LCH data available, maintaining the LCH priority of the UL grant for the PUSCH with UCI; and
  in accordance with a determination that the UL grant for the PUSCH with UCI is a UL grant with no LCH data available, increasing the LCH priority of the UL grant for the PUSCH with UCI.

Example 16 is the method of example 2, further comprising:
  determining that a field lch-BasedPrioritization of an information element (IE) MAC-CellGroupConfig is configured;
  in accordance with a determination that a UL grant of the one or more UL grants is for the PUSCH with UCI and has LCH data available, maintaining the UL grant for the PUSCH with UCI during LCH-based prioritization; and
  in accordance with a determination that a UL grant of the one or more UL grants is for the PUSCH with UCI and has no LCH data available, prioritizing the UL grant for the PUSCH with UCI during LCH-based prioritization,
  wherein the selecting the UL grant for transmission comprises:
  selecting the prioritized UL grant as the UL grant for transmission.

Example 17 is the method of example 1, wherein each of the one or more indications indicates a physical layer (PHY) priority of a corresponding one of the one or more UL grants.

Example 18 is the method of example 17, further comprising:
  in accordance with a determination that a UL grant of the one or more UL grants is for the PUSCH with UCI, prioritizing the UL grant for the PUSCH with UCI by taking into account the PHY priority of the UL grant for the PUSCH with UCI,
  wherein the selecting the UL grant for transmission comprises:
  with the UL grant for the PUSCH with UCI being prioritizing, selecting the UL grant for transmission from the one or more UL grants.

Example 19 is the method of example 18,
wherein the PHY priority is one selected from a group consisting of a first PHY priority and a second PHY priority, the first PHY priority being higher than the second PHY priority,
wherein the prioritizing the UL grant for the PUSCH with UCI comprises:
in accordance with a determination that the PUSCH with UCI has the first PHY priority, prioritizing, during LCH-based prioritization, the UL grant for the PUSCH with UCI to be such a prioritized UL grant that the PUSCH with UCI cannot be skipped, and
wherein the selecting the UL grant for transmission comprises:
selecting the prioritized UL grant as the UL grant for transmission.

Example 20 is the method of example 18, wherein the prioritizing of the LCH priority of the UL grant for the PUSCH with UCI is only allowed for a subset of PHY priority levels.

Example 21 is the method of example 20, wherein the prioritizing the LCH priority of the UL grant for the PUSCH with UCI comprises:
in accordance with a determination that a restriction, indicating that the prioritizing of the LCH priority of the UL grant for the PUSCH with UCI is only allowed for the subset of PHY priority levels, is received from a network and that the PHY priority of the UL grant for the PUSCH with UCI falls within the subset of PHY priority levels, increasing the LCH priority of the UL grant for the PUSCH with UCI before LCH-based prioritization.

Example 22 is the method of example 18, wherein the prioritizing the LCH priority of the UL grant for the PUSCH with UCI comprises:
increasing, before LCH-based prioritization, the LCH priority of the UL grant for the PUSCH with UCI by different values depending upon the PHY priority of the UL grant for the PUSCH with UCI.

Example 23 is the method of example 22, further comprising:
maintaining a plurality of sets of LCH priority modification parameters, each set for a corresponding one of a plurality of PHY priority levels,
wherein the increasing the LCH priority of the UL grant for the PUSCH with UCI comprises:
increasing the LCH priority of the UL grant for the PUSCH with UCI using a corresponding set of LCH priority modification parameters corresponding to the PHY priority of the UL grant for the PUSCH with UCI.

Example 24 is the method of example 22,
wherein each PHY priority corresponds to a corresponding LCH priority level, and
wherein the increasing the LCH priority of the UL grant for the PUSCH with UCI comprises:
modifying the LCH priority of the UL grant for the PUSCH with UCI to the corresponding LCH priority level based upon the PHY priority of the UL grant for the PUSCH with UCI.

Example 25 is the method of example 9, further comprising:
in accordance with a determination that a UL grant of the one or more UL grants is for the PUSCH with UCI and that the UCI carries HARQ-ACK, prioritizing the UL grant for the PUSCH with UCI regardless of logical channel (LCH)-based prioritization; and
in accordance with a determination that a UL grant of the one or more UL grants is for the PUSCH with UCI and that the UCI carries CSI;
obtaining a prioritized UL grant of the one or more UL grants selected by LCH-based prioritization regardless of the UCI; and
creating an empty medium access control (MAC) protocol data unit (PDU) for the PUSCH with UCI when there is no overlapping UL grant,
wherein the selecting the UL grant for transmission comprises:
selecting the prioritized UL grant as the UL grant for transmission.

Example 26 is the method of example 25, wherein the prioritizing the UL grant for the PUSCH with UCI regardless of LCH-based prioritization comprises:
in accordance with a determination that there is no overlapping PUSCH of higher physical layer (PHY) priority than the PHY priority of the UL grant for the PUSCH with UCI, prioritizing the UL grant for the PUSCH with UCI regardless of LCH-based prioritization.

Example 27 is the method of example 2, further comprising:
in accordance with a determination that the one or more UL grants overlap in time domain, creating a MAC PDU for a UL grant of the one or more UL grants that is not selected for transmission; and
merging the UCI onto the PUSCH corresponding to the selected UL grant for transmission.

Example 28 is an apparatus for a user equipment (UE), the apparatus comprising: one or more processors configured to perform steps of the method according to any of examples 1-27.

Example 29 is a computer readable medium having computer programs stored thereon which, when executed by one or more processors, cause an apparatus to perform steps of the method according to any of examples 1-27.

Example 30 is an apparatus for a communication device, comprising means for performing steps of the method according to any of examples 1-27.

Example 31 is a computer program product comprising computer programs which, when executed by one or more processors, cause an apparatus to perform steps of the method according to any of examples 1-27.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a user equipment (UE), comprising:
obtaining one or more indications associated with uplink transmission scheduled by one or more uplink (UL) grants, the one or more UL grants including a UL grant for a physical uplink share channel (PUSCH) with uplink control information (UCI);
selecting a UL grant for transmission from the one or more UL grants based at least in part upon the one or more indications, such that the UL grant for the PUSCH with UCI is prioritized for selection, wherein each of the one or more indications indicates whether a corresponding one of the one or more UL grants is for the PUSCH with UCI;
causing a PUSCH corresponding to the selected UL grant to be transmitted;
determining that a field lch-BasedPrioritization of an information element (IE) MAC-CellGroupConfig is configured; and
in accordance with a determination that a UL grant of the one or more UL grants is for the PUSCH with UCI, increasing a logical channel (LCH) priority of the UL grant for the PUSCH with UCI before LCH-based prioritization,
wherein the selecting the UL grant for transmission comprises:
with the LCH priority of the UL grant for the PUSCH with UCI being increased, selecting the UL grant for transmission from the one or more UL grants based at least in part upon respective LCH priorities of the one or more UL grants.

2. The method of claim 1, wherein the increasing the LCH priority of the UL grant for the PUSCH with UCI comprises:
increasing the LCH priority of an LCH mapped to the PUSCH with UCI by a fixed value.

3. The method of claim 1, wherein the increasing the LCH priority of the UL grant for the PUSCH with UCI comprises:
increasing the LCH priority of the UL grant for the PUSCH with UCI based upon a parameter received from a network, the parameter representing a modification to the LCH priority of an LCH mapped to the PUSCH with UCI.

4. The method of claim 3,
wherein the parameter represents a replacement priority of the LCH priority of the LCH mapped to the PUSCH with UCI, the replacement priority being higher than the LCH priority of the LCH mapped to the PUSCH with UCI, and
wherein the increasing the LCH priority of the UL grant for the PUSCH with UCI comprises: replacing the LCH priority of the LCH mapped to the PUSCH with UCI with the replacement priority.

5. The method of claim 3,
wherein the parameter represents an addend to the LCH priority of the LCH mapped to the PUSCH with UCI, and
wherein the increasing the LCH priority of the UL grant for the PUSCH with UCI comprises: adding the addend to the LCH priority of the LCH mapped to the PUSCH with UCI to increase the LCH priority of the UL grant for the PUSCH with UCI.

6. The method of claim 1, wherein the increasing the LCH priority of the UL grant for the PUSCH with UCI comprises:
in accordance with a determination that the UL grant for the PUSCH with UCI is a UL grant with LCH data available, maintaining the LCH priority of the UL grant for the PUSCH with UCI; and
in accordance with a determination that the UL grant for the PUSCH with UCI is a UL grant with no LCH data available, increasing the LCH priority of the UL grant for the PUSCH with UCI.

7. The method of claim 1, further comprising:
determining that a field lch-BasedPrioritization of an information element (IE) MAC-CellGroupConfig is configured;
in accordance with a determination that a UL grant of the one or more UL grants is for the PUSCH with UCI and has LCH data available, maintaining the UL grant for the PUSCH with UCI during LCH-based prioritization; and
in accordance with a determination that a UL grant of the one or more UL grants is for the PUSCH with UCI and has no LCH data available, prioritizing the UL grant for the PUSCH with UCI during LCH-based prioritization,
wherein the selecting the UL grant for transmission comprises:
selecting the prioritized UL grant as the UL grant for transmission.

8. An apparatus for a user equipment (UE), comprising:
a memory to store one or more indications associated with uplink transmission scheduled by one or more uplink (UL) grants; and
one or more processors configured to cause the UE to:
obtain the one or more indications associated with uplink transmission scheduled by one or more UL grants, the one or more UL grants including a UL grant for a physical uplink share channel (PUSCH) with uplink control information (UCI), wherein each of the one or more indications indicates whether a corresponding one of the one or more UL grants is for the PUSCH with UCI;
select a UL grant for transmission from the one or more UL grants based at least in part upon the one or more indications, such that the UL grant for the PUSCH with UCI is prioritized for selection;
cause a PUSCH corresponding to the selected UL grant to be transmitted;
determine that a field lch-BasedPrioritization of an information element (IE) MAC-CellGroupConfig is configured; and
in accordance with a determination that a UL grant of the one or more UL grants is for the PUSCH with UCI, increase a logical channel (LCH) priority of the UL grant for the PUSCH with UCI before LCH-based prioritization, wherein the one or more processors configured to cause the UE to select the UL grant for transmission are further configured to:
with the LCH priority of the UL grant for the PUSCH with UCI being increased, select the UL grant for transmission from the one or more UL grants based at least in part upon respective LCH priorities of the one or more UL grants.

9. The apparatus of claim 8, wherein the one or more processors are further configured to cause the UE to:
determine that a field lch-BasedPrioritization of an information element (IE) MAC-CellGroupConfig is configured;
in accordance with a determination that a UL grant of the one or more UL grants is for the PUSCH with UCI and has LCH data available, maintain the UL grant for the PUSCH with UCI during LCH-based prioritization; and
in accordance with a determination that a UL grant of the one or more UL grants is for the PUSCH with UCI and has no LCH data available, prioritize the UL grant for the PUSCH with UCI during LCH-based prioritization,
wherein the one or more processors configured to cause the UE to select the UL grant for transmission are further configured to cause the UE to:
select the prioritized UL grant as the UL grant for transmission.

10. The apparatus of claim 8, wherein the one or more processors configured to cause the UE to increase the LCH priority of the UL grant for the PUSCH with UCI are further configured to cause the UE to:
increase the LCH priority of an LCH mapped to the PUSCH with UCI by a fixed value.

11. The apparatus of claim 8, wherein the one or more processors configured to cause the UE to increase the LCH priority of the UL grant for the PUSCH with UCI are further configured to cause the UE to:
in accordance with a determination that the UL grant for the PUSCH with UCI is a UL grant with LCH data available, maintain the LCH priority of the UL grant for the PUSCH with UCI; and
in accordance with a determination that the UL grant for the PUSCH with UCI is a UL grant with no LCH data available, increase the LCH priority of the UL grant for the PUSCH with UCI.

12. The apparatus of claim 8, wherein the one or more processors configured to cause the UE to increase the LCH priority of the UL grant for the PUSCH with UCI are further configured to cause the UE to:
increase the LCH priority of the UL grant for the PUSCH with UCI based upon a parameter received from a network, the parameter representing a modification to the LCH priority of an LCH mapped to the PUSCH with UCI.

13. The apparatus of claim 12,
wherein the parameter represents a replacement priority of the LCH priority of the LCH mapped to the PUSCH with UCI, the replacement priority being higher than the LCH priority of the LCH mapped to the PUSCH with UCI, and
wherein the one or more processors configured to cause the UE to increase the LCH priority of the UL grant for the PUSCH with UCI are further configured to cause the UE to:
replace the LCH priority of the LCH mapped to the PUSCH with UCI with the replacement priority.

14. The apparatus of claim 12,
wherein the parameter represents an addend to the LCH priority of the LCH mapped to the PUSCH with UCI, and
wherein the one or more processors configured to cause the UE to increase the LCH priority of the UL grant for the PUSCH with UCI are further configured to cause the UE to: add the addend to the LCH priority of the LCH mapped to the PUSCH with UCI to increase the LCH priority of the UL grant for the PUSCH with UCI.

15. A non-transitory computer-readable storage medium including instructions that when executed by one or more processors of a user equipment (UE), cause the UE to:
obtain one or more indications associated with uplink transmission scheduled by one or more uplink (UL) grants, the one or more UL grants including a UL grant for a physical uplink share channel (PUSCH) with uplink control information (UCI);
select a UL grant for transmission from the one or more UL grants based at least in part upon the one or more indications, such that the UL grant for the PUSCH with UCI is prioritized for selection, wherein each of the one or more indications indicates whether a corresponding one of the one or more UL grants is for the PUSCH with UCI;
cause a PUSCH corresponding to the selected UL grant to be transmitted;
determine that a field lch-BasedPrioritization of an information element (IE) MAC-CellGroupConfig is configured; and
in accordance with a determination that a UL grant of the one or more UL grants is for the PUSCH with UCI, increase a logical channel (LCH) priority of the UL grant for the PUSCH with UCI before LCH-based prioritization,
wherein to select the UL grant for transmission comprises:
with the LCH priority of the UL grant for the PUSCH with UCI being increased, select the UL grant for transmission from the one or more UL grants based at least in part upon respective LCH priorities of the one or more UL grants.

* * * * *